(12) United States Patent
Gouvernel

(10) Patent No.: US 10,152,684 B2
(45) Date of Patent: Dec. 11, 2018

(54) DEVICE, METHOD AND SYSTEM FOR VALUATING INDIVIDUALS AND ORGANIZATIONS BASED ON PERSONAL INTERACTIONS

(71) Applicant: ADP, LLC, Roseland, NJ (US)

(72) Inventor: Jerome Gouvernel, Paris (FR)

(73) Assignee: ADP, LLC, Roseland, NJ (US)

( * ) Notice: Subject to any disclaimer, the term of this patent is extended or adjusted under 35 U.S.C. 154(b) by 872 days.

(21) Appl. No.: 14/602,862

(22) Filed: Jan. 22, 2015

(65) Prior Publication Data

US 2015/0206088 A1    Jul. 23, 2015

Related U.S. Application Data

(60) Provisional application No. 61/930,751, filed on Jan. 23, 2014.

(51) Int. Cl.
| | |
|---|---|
| *G06Q 10/00* | (2012.01) |
| *G06Q 10/06* | (2012.01) |
| *G06F 21/31* | (2013.01) |
| *G06F 17/22* | (2006.01) |
| *H04W 16/14* | (2009.01) |
| *H04W 48/08* | (2009.01) |
| *G07C 9/00* | (2006.01) |
| *G07C 5/00* | (2006.01) |

(52) U.S. Cl.
CPC ... *G06Q 10/06393* (2013.01); *G06F 17/2229* (2013.01); *G06F 21/316* (2013.01); *G06Q 10/063116* (2013.01); *H04W 16/14* (2013.01); *H04W 48/08* (2013.01); *G07C 5/008* (2013.01); *G07C 9/00571* (2013.01)

(58) Field of Classification Search
None
See application file for complete search history.

(56) References Cited

U.S. PATENT DOCUMENTS

| | | | | |
|---|---|---|---|---|
| 7,607,014 | B2* | 10/2009 | Larson | G06F 21/35 |
| | | | | 713/154 |
| 9,684,881 | B2* | 6/2017 | Heier | G06Q 10/063116 |
| 2008/0300951 | A1* | 12/2008 | Kelly | G06Q 10/06 |
| | | | | 705/7.13 |
| 2012/0130774 | A1* | 5/2012 | Ziv | G06Q 10/06393 |
| | | | | 705/7.39 |
| 2014/0114824 | A1* | 4/2014 | Kong | G06Q 10/1091 |
| | | | | 705/32 |
| 2015/0006213 | A1* | 1/2015 | Heier | G06Q 10/063116 |
| | | | | 705/7.16 |

* cited by examiner

*Primary Examiner* — Gurkanwaljit Singh
(74) *Attorney, Agent, or Firm* — Joseph V. Saphia; Haug Partners LLP

(57) ABSTRACT

A computerized system and method for evaluating relationships between individuals and within organizations based on electronic evaluations of personal interactions. At least one of the participants in the personal interactions completes an electronic evaluation by providing a binary level input in response to a statement or question to indicate whether the interaction with another individual is favorable or not.

3 Claims, 18 Drawing Sheets

|  | Weekly Score |
|---|---|
| current week | 40 |
| week - 1 | 54 |
| week - 2 | 56 |
| week - 3 | 58 |
| week - 4 | 50 |

FIG. 6

DEVICE, METHOD AND SYSTEM FOR VALUATING INDIVIDUALS AND ORGANIZATIONS BASED ON PERSONAL INTERACTIONS

RELATED APPLICATIONS

This application claims benefits to Provisional Application No. 61/930,751, titled "Computerized Valuation of Individuals and Organizations Based on Electronic Evaluations of Personal Interactions by Individuals Participating in The Interactions," filed on Jan. 23, 2014, the entirety of which is incorporated herein by reference.

FIELD OF INVENTION

This application relates to computerized valuations of individuals and/or organizations based on electronic evaluations of personal interactions between individuals and/or interactions between individuals and organizations, made by individuals who participate in the interactions, and to the management thereof, and to relationships between and/or among individuals and/or organizations based on the valuations. Personal interactions may include, but are not limited to, in-person interactions and electronic personal interactions in which individuals personally contemporaneously participate over a network.

BRIEF SUMMARY

Personal interactions between two or more individuals within an organization are discrete events that may create or destroy value for organizations and the individuals alike. Such interactions are frequent occurrences within an organization, and may take place at all levels within the organization. Electronic evaluations of such interactions provide a source of extensive data at the individual level within an organization for use in the computerized valuation of individuals and organizations.

Similar personal interactions occur between individuals and organizations, and electronic evaluation of such interactions provide a source of extensive data at the individual level for use in the computerized evaluation of organizations in discovering communication structures, patterns, efficiency, and aggregation within a corporation, a department, a project, a work team, or between a business and its customers. It is also conceivable to perform a similar analysis in a group of electronic communication devices, including computers, laptops, tablets, PDAs, phones, smart phones, printers, facsimile machines, and copy machines.

An aspect of the present application relates to a computerized method of generating a computer interface for evaluating a reviewee based on a plurality of interactions with reviewers. The method comprises presenting a first display that has at least one statement relating to an evaluation of an interaction with the reviewee and is configured to receive an input from a reviewer indicating whether the interaction is favorable; storing the received input in at least one storage device in association with the reviewee; aggregating received input stored in association with the reviewee; and determining, from the aggregated received input for the reviewee, an overall score for the reviewee indicative of a valuation result of the reviewee.

One or more embodiments provide for evaluations of such interactions by at least one of the participants to take promptly (e.g., on the same day or the next business day or two), preferably immediately (e.g., immediately following the interaction or within one or a few hours on the same or the next business day), after an interaction in order to improve the quality of the evaluations, as memory and judgment of individuals may become inaccurate over time, and assessments of these personal interactions may become obscured by recent events and may be subject to rationalizations.

One or more embodiments present evaluation information in formats that are simple and quick for an individual to electronically complete. According to some embodiments, presented evaluation formats provide binary level evaluation choices from which a reviewer may select an input from two choices, e.g., yes/no, true/false, favorable/unfavorable, good/bad, positive/negative, etc.

According to one or more embodiments, at least one of the participants of a personal interaction completes an electronic evaluation of another individual or individuals participating in the interaction. For convenience, an individual completing an electronic evaluation may be referred to as a reviewer (or the reviewing individual), and an individual who is the subject of an electronic evaluation may be referred to as a reviewee (or the reviewed individual).

One or more embodiments provide prompts, invitations or requests to an individual or individuals involved in a personal interaction to complete an electronic evaluation regarding the personal interaction. According to some embodiments, such prompts are generated automatically, either before or after a personal interaction, and the prompts may be generated based on data relating to the personal interaction developed for purposes other than a possible evaluation of the interaction. In other embodiments, an interaction participant may initiate an evaluation for any interaction or computer-selected interactions.

According to some embodiments, evaluation prompts or invitations are generated automatically, and data used for generating the prompts or invitations comprises one or more of individual calendar and/or organization data, email messages, text messages, call history data, individual and/or organization contact data, data or signals received using near-field technology, presence data, and social network data.

One or more embodiments provide for processing data from the evaluations to provide metrics which indicate valuations of individuals and organizations. According to some embodiments, an indicator, such as a score or value, is computed for an evaluation using the data provided by the evaluation. According to some embodiments, the metrics comprise scores for individuals and organizations that are determined based on aggregated data from the evaluations, e.g., aggregated score data from the evaluations. Such metrics may be used to improve management, employee relations, customer service, etc., of an organization based on input by individual members of the organization or by non-member individuals interacting with the organization.

One or more embodiments provide for processing data from the evaluations to establish a score corresponding to the relationship strength between individuals based on the evaluations.

According to one or more embodiments, the evaluation data includes data identifying the reviewing and reviewed individuals, and processing of evaluation data includes associating evaluating individual identity data (reviewee's identity date) with evaluated individual identity data (reviewer's identity data). According to some embodiments, associations of evaluating individual data and evaluated individual data are processed to establish relationships among individuals and display such relationships in a form of a graphical representation, e.g., personal networks, or networks defining groups, etc.

According to one or more embodiments, binary level evaluation choices describe the quality of an interaction, e.g., positive or negative, good or bad, etc. An example of a binary level choice in one such embodiment is the question "How was our last interaction?," with the choices being "+" and "−". According to various embodiments, different scores may be assigned to positive and negative choices, e.g., 1 for a positive choice and 0 for a negative choice.

According to one or more embodiments, binary level evaluation choices describe one or more qualities or attributes of individual participants. Such qualities may include, according to various embodiments, whether an individual is "well organized," "engaging," "prepared," "decisive," "helpful'", etc. The choices associated with such qualities may be "+" and "−" or "yes" or "no." According to various embodiments, different scores may be assigned to positive, such as a yes input, and negative, such as an input, choices, e.g., 1 for a positive or yes choice and 0 for a negative or no choice.

According to one or more embodiments, results of evaluations are provided to reviewees via a user interface which provides for input by reviewers commenting on an interaction and/or an evaluation.

According to one or more embodiments, scores for interaction quality and individual quality may be weighted. According to one or more embodiments, different scores may be associated with interaction quality choices and individual quality choices, and/or among individual quality choices.

According to one or more embodiments, methods, systems and computer program products disclosed herein provide for and/or perform the functionality described herein and other functionality.

According to one or more embodiments, at least one computing device is configured to create a user interface accessible by a reviewer and/or reviewee, for each of a plurality of selected interactions between a reviewee and reviewers, (a) to present (i) at least one query relating to the quality of the interaction and/or at least one query relating to a quality of the reviewee participating in the interaction, (ii) two user selectable choices responsive to each query, and (iii) receive user input selecting one of two choices for each presented query, and (b) to store interaction data for a respective interaction in at least one storage device comprising query data representing the query or queries, response data representing selected choices to query or queries and identifying data identifying the reviewee and the reviewer.

According to one or more embodiments, the at least one computing device aggregates data comprised of stored interaction data and provides from the aggregated data a numerical score for the reviewee who participated in a plurality of the interactions.

According to one or more embodiments, the numerical score for each reviewee is indicative of the reviewee's performance in an organization in which the reviewee is a member.

According to one or more embodiments, the numerical score is determined based on aggregated data of responses limited to queries relating to the quality of the interaction, or is determined based on aggregated data of responses limited to queries relating to a quality of individuals participating in the interactions, or is determined based on both aggregated data of responses to queries relating to the quality of the interaction and the quality of an individuals participating in the interactions.

According to one or more embodiments, the at least one computing device aggregates data comprised of stored interaction data and provides from the aggregated data a relative indication of a quality or qualities for at least one of the plurality of individuals who participated in a plurality of the interactions as a reviewee based on aggregated data of responses limited to queries relating to a quality of individuals participating in the interactions.

According to one or more embodiments, the at least one computing device presents relative indications as text or graphics describing the particular quality with additional text or graphics indicating a relative score for the particular quality. For example, a particular quality may be "well-organized," and the relative strength of that quality in an individual may be represented in a gray scale for the text or by a number next to the text.

According to one or more embodiments, the at least one computing device sorts evaluations of reviewees by reviewers, and present, in connection with a reviewee, the identity of each reviewer. In some embodiments, the at least one computing device presents, with the identity of the reviewers, the number of times a reviewer evaluated the reviewee. In some embodiments, the at least one computing device presents, with the identity of reviewers, the results of evaluations of the reviewee by the identified reviewers. In some embodiments, the at least one computer presents, with the identity of reviewers, an image representing identified reviewers.

According to one or more embodiments, the at least one computing device generates evaluation prompts or invitations automatically without any input from a user. A prompt may be generated based on data comprising one or more of individual calendar and/or organization data, email messages, text messages, call history data, individual and/or organization contact data, data or signals received using near-field technology, presence data, and social network data.

According to one or more embodiments, individuals participating in the personal interactions are members of an organization, and each has access to a personal computing device which is configured via a user interface to present the queries and receive the user input selections. Examples of personal computing devices include desk top computers, laptop computers, tablet computers, PDAs and smart phones.

According to one or more embodiments, the at least one computing device comprises at least one organizational computer, such as a server, host or central computer, and personal computing devices to which individual participants have access which communicate over a network, e.g., a phone network, a LAN, WAN, an intranet, and the Internet.

According to one or more embodiments, individuals who are members of an organization and want to participate in personal interaction evaluations register with an organizational computer, e.g., via their personal computing devices. In some embodiments, networks or groups may be created within an organization, e.g., by the organization or its members, and individuals may register for one or more such networks.

According to one or more embodiments, an organizational computer generates the evaluation prompts or invitations automatically and without user input. A prompt may be generated based on data, as described above, and electronically transmits the invitations to personal computing devices of evaluating individuals. According to various embodiments, the organizational computer determines, from actual or potential participants of a personal interaction, at least one reviewee based on various data and/or settings. For example, the organizational computer determines reviewers based on a hierarchy in the organization of participating individuals, and/or the relative frequencies over time or in a given time period at which participants have been designated as reviewers, and/or the numbers of times in a given time period or the total number of times, in which participants have been designated as reviewers, and/or based on input from an administrator or one or more participants, etc.

According to one or more embodiments, an organizational computer computes metrics based on evaluations for given time periods, e.g., weekly, monthly, annually and/or for organizationally significant time periods such as fiscal time periods, employee rating time periods and/or employee compensation time periods, etc.

According to one or more embodiments, an organizational computer processes evaluations, and presents evaluation results and computations; for example as described above in connection with at least one computing device, for display on respective individual personal computing devices. In some embodiments, the organizational computer sorts individuals by networks in which the individuals are registered, and presents evaluations by network.

According to one or more embodiments, an organizational computer sorts individuals by network and presents to personal computing devices of individuals in a network the identity of each other individual in the same network, e.g., by displaying the identity, in text, of and/or an image representing each individual in the same network.

According to one or more embodiments, an organizational computer processes evaluations associated with a reviewee, and presents evaluation results and computations from reviewer's responses in the reviewee's network; for example, as described above in connection with at least one computing device, for display on a respective individual computing device. In some embodiments, the identity of the reviewee and the individuals in the reviewee's network are displayed in text and/or a representative image, whose placement in proximity to the reviewee is based on a function of interaction productivity and interaction frequency.

According to an aspect, the present application relates to a computerized method of generating a computer interface for evaluating a reviewee. The method comprises accessing event data from an electronic file associated with a reviewer; and generating, upon a detection of the completion of an event based on the event data in the electronic file, a first display that prompts the reviewer to review the event that involves the reviewee.

According to some embodiments, the electronic file includes an electronic calendar, an email, a text message, a call history file, or the reviewer's data of a social network.

According to an aspect, the present application is directed to a computerized method of generating a computer interface for evaluating a reviewee. The method comprises accessing identity data from an electronic file associated with the reviewer; and generating, when a near-field signal indicating identity data associated with a reviewee is received by an electronic device of the reviewer, a first display that prompts the reviewer to review the reviewee.

According to some embodiments, the near-field signal includes a Bluetooth signal or a wireless signal.

BRIEF DESCRIPTION OF THE DRAWINGS

FIG. 6 is a table exemplifying the evolution of a reviewee's five-week score according to an embodiment of the present application.

DETAILED DESCRIPTION

Embodiments of the disclosed subject matter include methods and systems to evaluate persons based on the evaluation of a plurality of interactions between individuals and generate a machine interface thereof. The embodiments of the disclosed subject matter are computed-implemented.

Figure 1:
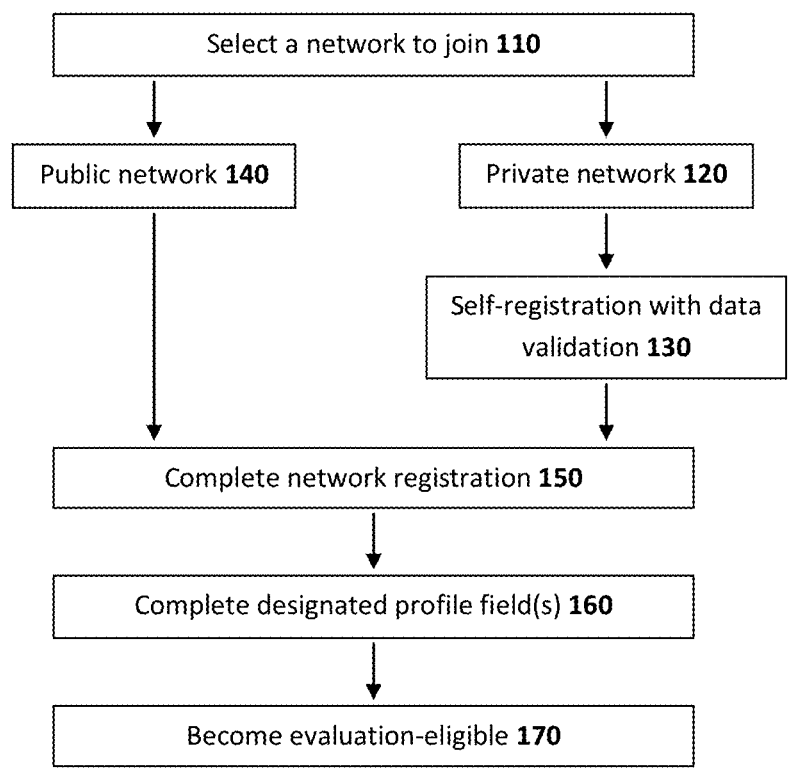
FIG. 1 is a flow chart of a process to join participating individuals to a network according to an embodiment of the present application.

FIG. 1 is a flow chart exemplifying a process to join participating individuals to a network. In block 110, an individual selects a network to join. A network is comprised of at least two or more members. A network can be private or public. A participating individual can be a natural person, commercial entity (e.g., business), or any organization seeking to evaluate a plurality of interactions among members of the network.

Joinder to the network may be voluntary. That is, a participating individual may search for and identify a network to which the individual wishes to join. Alternatively, the participating individual may be prompted to join. Prompting may occur through the use of an invitation via an electronic communication (e.g., text or e-mail message). By way of example, the participating individual may receive an invitation to join in the form text or email message from the network.

A participating individual may also join a private network, as represented by block 120. In a private network, membership is limited to certain individuals and the results of any evaluation are not disclosed to those outside the network. Similarly, a private network may have a finite number of members, whereby membership is selective.

The private network may require the participating individual to self-register by entering data (block 130) to certify that the participating individual is authorized to join. If so, these credentials may be provided to the participating individual before the network is selected.

Alternatively, a participating individual may join a public network, as represented by block 140. In a public network, membership is permitted for all, and the results of any evaluation are public to all members. For example, a public network could be a platform whereby a business may join to receive customer feedback regarding its interactions with customers.

In block 150, the participating individual completes registration with the network. A network administrator may supervise the network, and may require the participating individual to complete a profile. The profile may require a particular field or fields to be completed (e.g., name, image or picture, position, activities, network sub-set membership) (block 160).

In block 170, the participating individual becomes a member of the network. The participating individual may now evaluate other members and have its interactions evaluated by other members.

Figure 2:
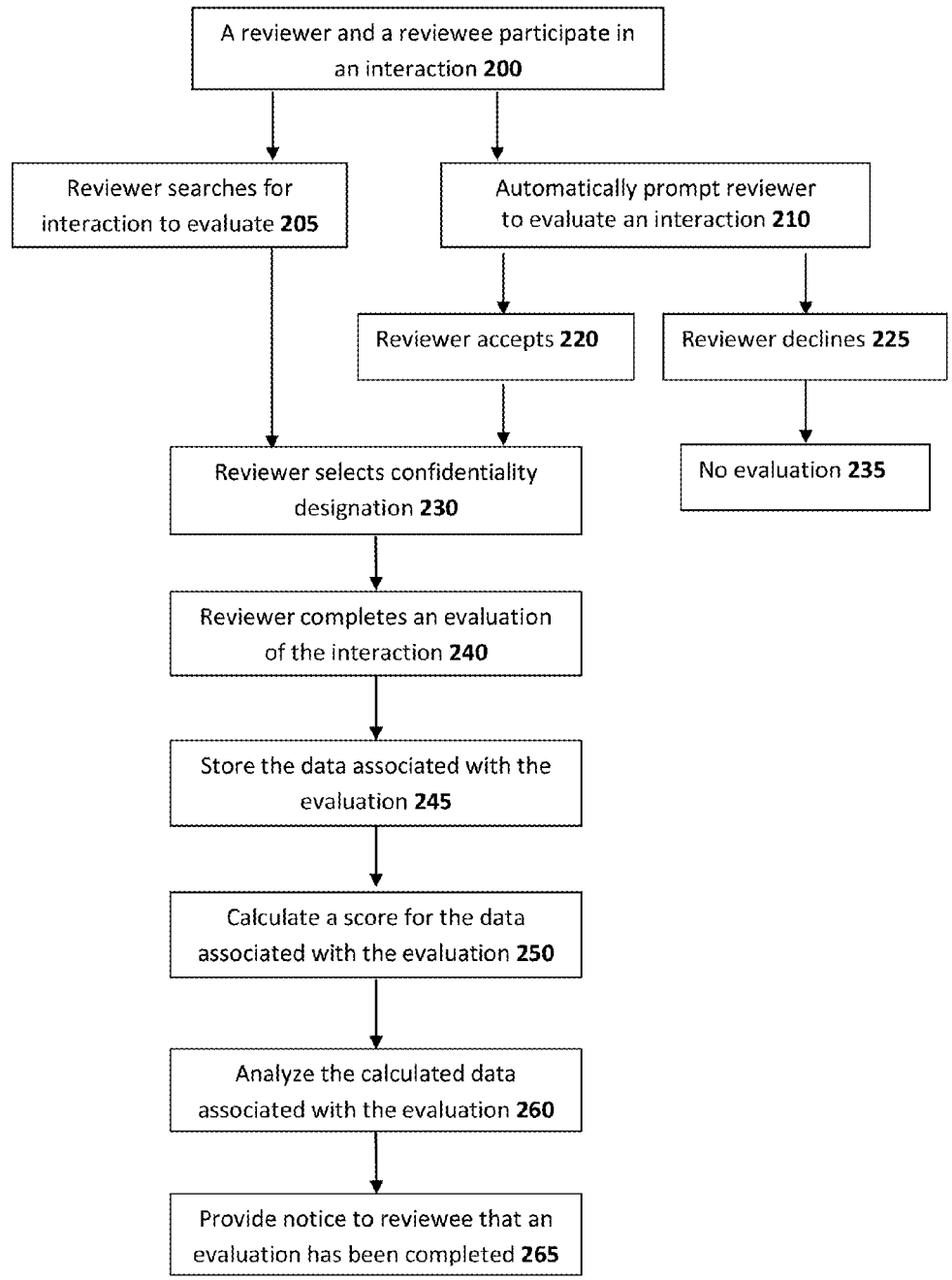
FIG. 2 is a flow chart of a process to evaluate an interaction between a reviewee and a reviewer according to an embodiment of the present application.

FIG. 2 is a flow chart of a process to evaluate an interaction between a reviewee and a reviewer.

In block 200, an interaction occurs between at least two or more members of the network. A plurality of interactions among network members may occur. Network members may be assigned to one or more groups or teams. Thus, one or more interactions may occur between members of the same group or team, or between members of a different group or team.

The participants in an interaction include at least two members of a network. The interaction includes one or more reviewee(s) and at least one or more reviewer(s). At any time, a member may be a reviewer or a reviewee. The reviewee is the subject of the interaction, that is, whose conduct or performance during the interaction is evaluated. The reviewer is responsible for evaluating the reviewee's performance or conduct during the interaction.

In blocks 205 and 210, the reviewer is then prompted to evaluate the reviewee's performance, conduct, skills, or competency exhibited during the interaction. Prompting may occur by a variety of methods. The reviewer may search the network directory for a reviewee to evaluate a particular interaction (block 205). Additionally, the network may automatically prompt or invite the reviewer to complete an interaction (block 210).

Figure 3:
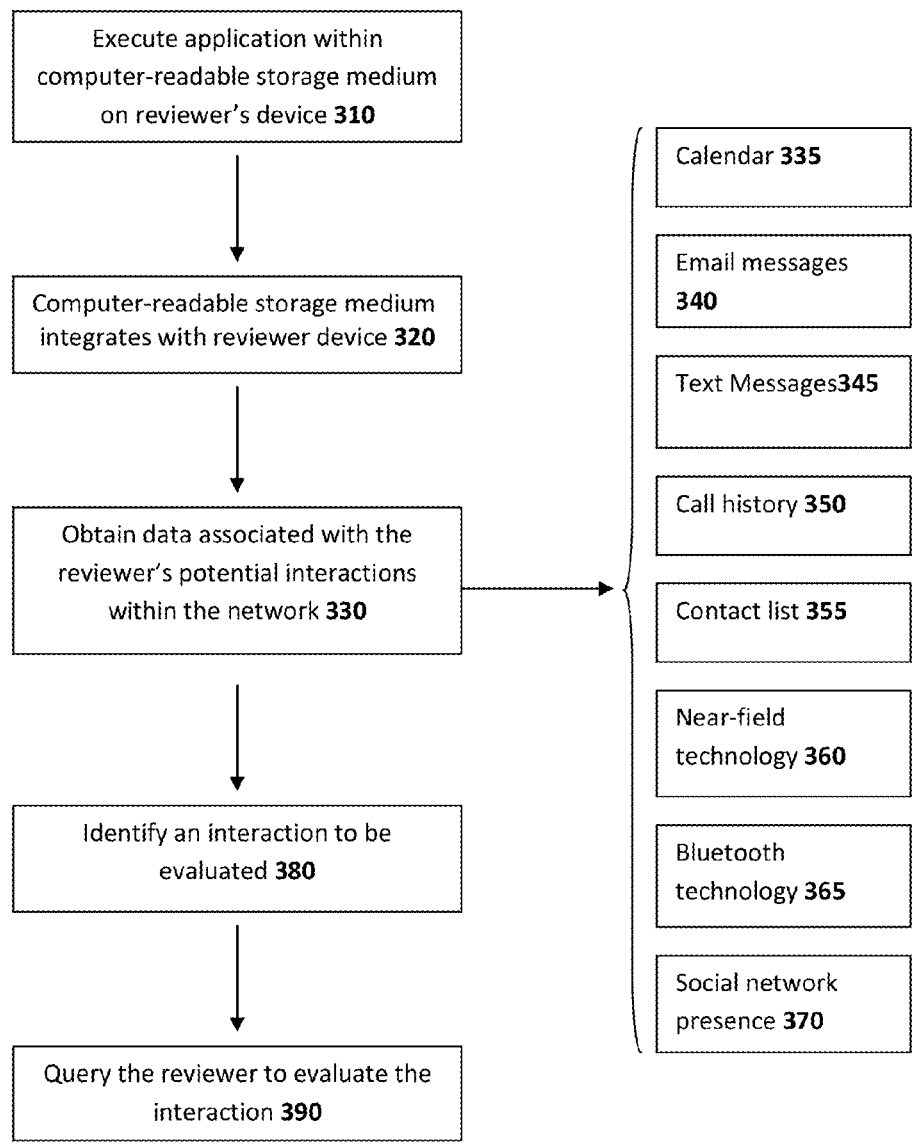
FIG. 3 is a flow chart of a process to prompt an evaluation of an interaction of a reviewee according to an embodiment of the present application.

FIG. 3 is a flow chart of a process to prompt an evaluation of an interaction of a reviewee. In block 310, a reviewer will execute a computer-readable storage medium within an input device. Execution of the computer-readable storage medium will cause an application to operate.

In block 320, the computer-readable storage medium will integrate with the reviewer's input device, and will obtain data related to the reviewer's interactions (block 330). These data may include meeting schedules, phone call records, emails, text messages, and friend lists of a social network. In blocks 335-370, the computer-readable storage medium may obtain data from the reviewer's calendar, e-mails, text messages, phone call histories, contact list, and social networking memberships for one or more interactions to evaluate. Additionally, the computer-readable storage medium may utilize Bluetooth or near-field communication technology to detect whether a reviewee (or a reviewee's input device) presents in close proximity to the reviewer (blocks 365 and 370).

Based on this data, the computer-readable storage medium will identify interactions by linking the events, locations and time within all members' input devices (block 380). If an interaction or reviewee is detected, a prompt or invitation for an evaluation will be triggered and sent to the reviewer.

In block 390, the reviewer will receive a notification prompt that the reviewer is eligible to evaluate one or more reviewee(s) that participate in the identified interaction. For example, the reviewer may be presented with a text notification, a picture message (e.g., an image of the reviewee pulled from the reviewee's profile), or a combination of the same. The frequency of the notification prompts may be pre-programmed based on the type of interaction that was identified (e.g., "Do you want to rate Jim after the meeting you attended with him?"), or the notification prompt may be generic (e.g., "How was your last interaction today?").

Figure 4:
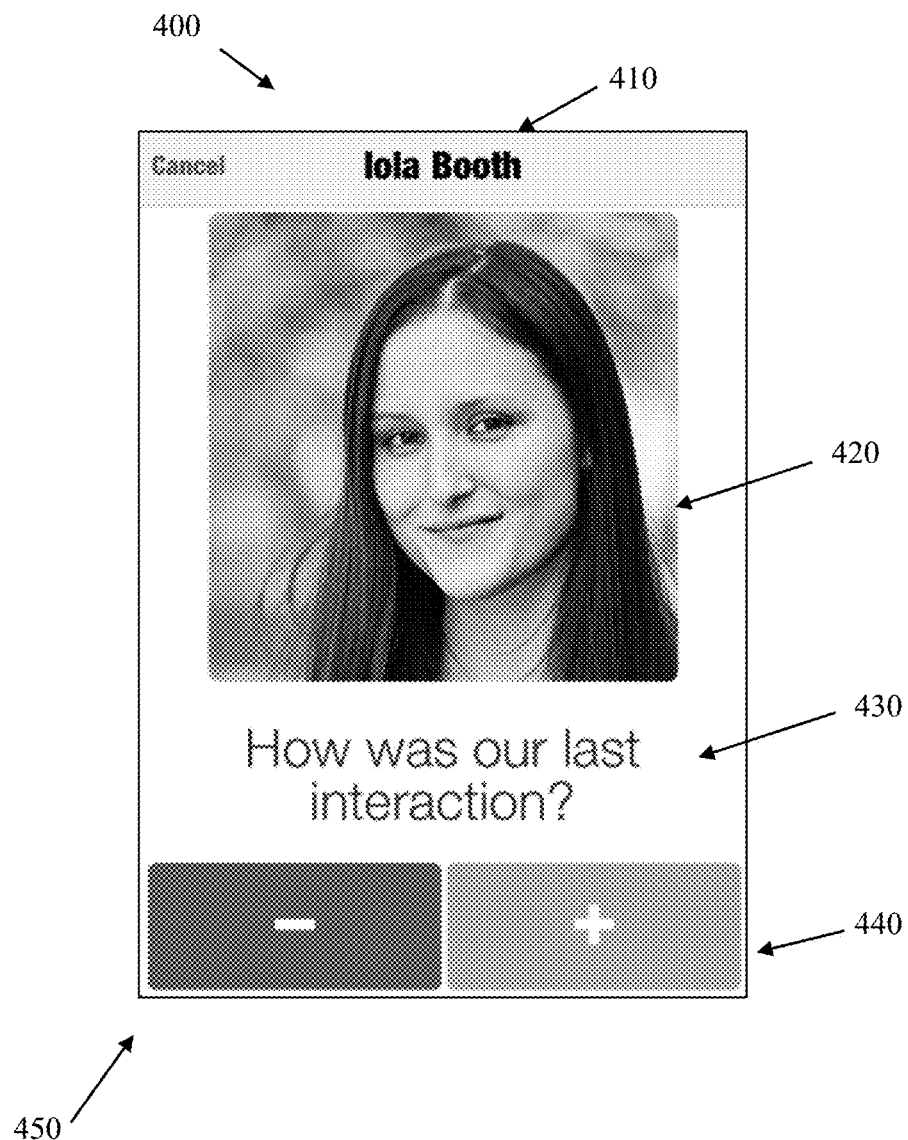
FIG. 4 is a diagram of a notification prompt for a reviewer to complete an evaluation according to an embodiment of the present application.

An example of a notification prompt for a reviewer to complete an evaluation is depicted in FIG. 4. The notification prompt 400 may present the reviewee's name 410 and an image of the reviewee 420. The notification prompt 400 will present an aspect of the interaction to be evaluated 430 in a question format (e.g., "How was our last interaction?").

Referring back to FIG. 2, the reviewer may accept or decline to evaluate the interaction after receiving the prompt as shown in blocks 225 and 230. If the reviewer declines, no evaluation occurs (blocks 225 and 335). If the reviewer accepts (block 225), it may complete an evaluation of the interaction. Optionally, the reviewer may select a confidentiality designation of "known" or "anonymous" before completing the evaluation (block 230). "Known" evaluations are public to all members or a particular group of members, whereas "anonymous" evaluations are private.

Evaluations are intended to be conducted immediately (or as near in time) after the interaction with the reviewee. Preferably, evaluations are to be completed promptly on the same day or the next business day or two. Most preferably, evaluations are to be completed immediately following the interaction or within a few business day hours. In that regard, there may be a time limit in which an evaluation may be completed. This time limit may be a default period, or it may be custom-defined by the network administrator or the reviewer.

Figure 5:
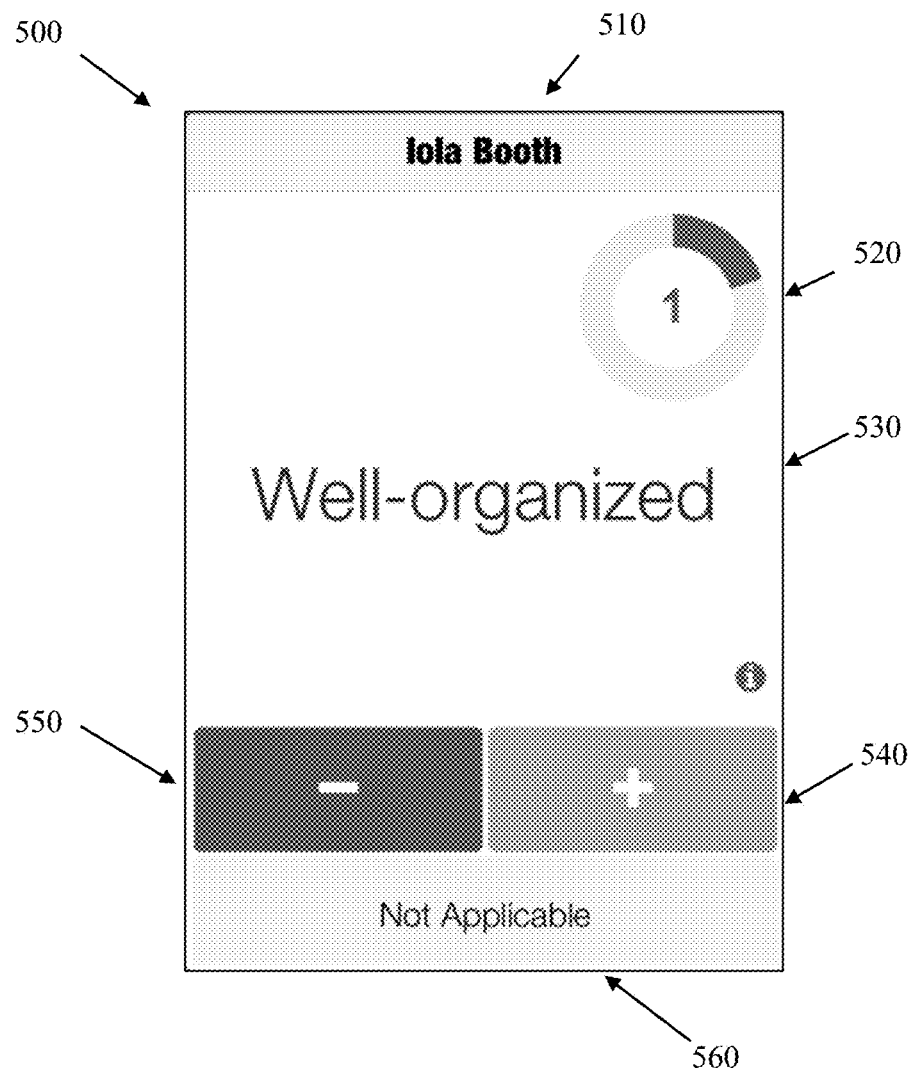
FIG. 5 is a diagram of an evaluation of an interaction with a time limit according to an embodiment of the present application.

FIG. 5 depicts an example of an evaluation with a time limit may be presented. The reviewer receives a display of the evaluation screen 500. The evaluation screen 500 will have the name of the reviewee 510 and a question or behavioral descriptor 530 to evaluate the reviewee. The timer 520 is also displayed on the evaluation screen 500. The timer 520 is presented as a count-down or other similar representation.

In block 240, the reviewer will complete an evaluation of the interaction. The reviewer is presented with predetermined choices such as a binary level evaluation choice to describe the quality of an interaction, e.g., positive or negative, good or bad, etc. An example of a binary level choice is the question "How was our last interaction?," with the choices being "+" and "−". The quality of the interaction may be a performance component (e.g., evaluating a meeting, project, or presentation), or a behavioral or social component (e.g., delivery, tone, subject matter). The reviewer may provide its data input pictorially (e.g., green or red button to represent "YES" or "NO", respectively), or as a number (e.g. 1 or 0 to represent "YES" or "NO", respectively). Likewise, different scores may be assigned to positive and negative choices, e.g., 1 for a positive choice and 0 for a negative choice.

Referring back to FIG. 4, this figure represents an example of how a reviewer may complete an evaluation of an interaction as described in block 240. The reviewer receives a notification prompt 400, which may present the reviewee's name 410 and an image of the reviewee 420. The notification prompt 400 will also present an aspect of the interaction to be evaluated 430. The aspect of the interaction to be evaluated 430 may be in a statement or question format (e.g., "How was our last interaction?"). The reviewer will then provide input based on two choices. For example, the reviewer's input will determine whether the statement or question is favorable 440 or unfavorable 450 as it relates the reviewee's performance during the interaction.

Additionally, the reviewer's binary level evaluation choices may describe one or more qualities or attributes of the reviewee. The reviewer will evaluate the one or more qualities or attributes of the reviewee observed during the interaction in the form of a behavioral descriptor. The choices associated with such qualities may be "+" and "−" or "yes" or "no," which indicate whether the behavioral descriptor favorably applies to the reviewee's performance during the interaction. Likewise, different scores may be assigned to positive and negative choices, e.g., 1 for a positive choice and 0 for a negative choice.

The behavioral descriptor may assist in identifying ideal attributes for a particular behavior or interaction. Additionally, the behavioral descriptor may assist with conducting a psychological evaluation of the reviewee.

The behavioral descriptor may be obtained from a pre-programmed list of terms, generated at random from a pre-populated list by a computer-readable storage medium or an algorithm, or custom-created by the reviewer during the evaluation. Optionally, the behavioral descriptor may also be generated based on the reviewer's response to the statement or question presented in block 240 and FIG. 4. A pre-programmed list of behavioral descriptors may be compiled and presented to the reviewer based on the particular type of interaction that is being evaluated. This generation may be achieved by branching or similar data organization techniques. By way of example, an interaction such as a meeting may have a preset of behavioral descriptors (e.g., leading, participative, prepared) that differ from the behavioral descriptors preset for a presentation (e.g., clear, communicative, leading, well-organized).

Referring back to FIG. 5, this figure represents an example of how a reviewer may complete an evaluation of an interaction based on a behavioral descriptor as described in block 240. The reviewer will receive a display of the evaluation screen 500. The evaluation screen 500 will have the name of the reviewee 510 and a behavioral descriptor 530 to evaluate the reviewee. The behavioral descriptor 530 may have a positive, negative or neutral connotation. The positive qualifier may be used to highlight the positive attributes of the reviewee. By way of example, positive behavioral descriptors may include: accessible, agile, autonomous, bold, clear, committed, communicative, convincing, cooperative, creative, curious, decisive, determined, dynamic, efficient, eloquent, engaging, flexible, friendly, helpful, influential, informative, innovative, inspired, inspiring, intuitive, leading, methodical, participative, pragmatic, prepared, productive, responsible, rigorous, serious, sociable, protective, strategic, tactful, well-organized, and willing. If the reviewer is unsure of the particular behavioral descriptor's meaning, a definition or explanation may be presented to the reviewer. The reviewer will then provide its input as to whether the behavioral descriptor describes 540 or does not describe 550 the reviewee. The reviewer may also input that the behavioral descriptor does not apply 560 to the reviewee.

In blocks 245 and 250, the data associated with the evaluation is then stored and calculated into a score. The score may be in the form of a NPS®. The NPS® is a metric developed by Frederick Reicheld (among others) and is described in Frederick F. Reichheld, "One Number You Need to Grow," *Harvard Business Review* (December 2003), the entirety of which is incorporated herein by reference. Generally, the NPS® compiles responses to one or more direct questions, and is often based on a 0 to 10 scale. However, any other numerical scoring technique as known in the art may be used.

Additionally, the data may be calculated over a period of time to create an overall score. For example, this time period may be a daily score. The daily score consists of all of the evaluations associated with a particular reviewee on a given day. Optionally, the daily score may be displayed to the reviewee.

An example of an algorithm that may be used to calculate the daily score is represented as follows:

$$\left(\frac{\sum(\text{evaluations})}{\text{Count(evaluations)}} + 1\right) * 50$$

However, other numerical scoring paradigms may be used.

In block 260, the score associated with the NPS® is then analyzed to create a historic score of all interactions associated with the same reviewee. The historic score may be a numerical score calculated from data associated with evaluations from a particular reviewer, a particular group of network members, or all of the reviewee's interactions during a particular time period. The historic score may also include the behavioral descriptors rated as "YES" or "NO" most frequently by a particular reviewer, a group of members, or all of the behavioral descriptor data during a particular time period. The historic score may be accessed/ reviewed by the reviewee, the network administrator, or any other designated network member.

The historic score may be calculated for any time period, such as weekly, monthly, or yearly. By way of example, the historic score may be related to the evaluations compiled over a 5-week, 3-month, 6-month, or 12-month time period. The historic score may also be a total score for all of the evaluations associated with the reviewee. A minimum number of evaluations may be required to calculate a historic score. According to an embodiment, when the minimum number of evaluations is not reached, then there is insufficient data for scoring, and a historic score is not calculated.

An example of a historic score is the 5-week score. The 5-week score is the weighted average of the thirty-five most recent daily scores. The 5-week score does not include the reviewee's daily score for the day that the 5-week score is calculated. Optionally, the 5-week score may be displayed to the reviewee. By way of example, if there are less than ten evaluations associated with a reviewee, then the 5-week score is not provided.

An example of an algorithm that may be used to calculate the 5-week score is represented as follows $$\frac{\sum (\text{daily Evaluations} * \text{daily Scores})}{\sum (\text{daily Evaluations})}$$

However, other numerical scoring paradigms may be used.

Moreover, the evolution of a reviewee's five most recent weekly scores may be displayed to the reviewee. The display may be a numerical total, picture, table, or graph.

FIG. 6 represents the evolution of a reviewee's five-week score in table form (600). The five-week score will include numerical values of the weekly score 610, the numerical value for the current week 620, and numerical values for four preceding weeks 630.

In block 265, the reviewee is notified that an evaluation has been completed. The notification may be a text message, e-mail message, a picture message, or a combination of the same.

Figure 7:
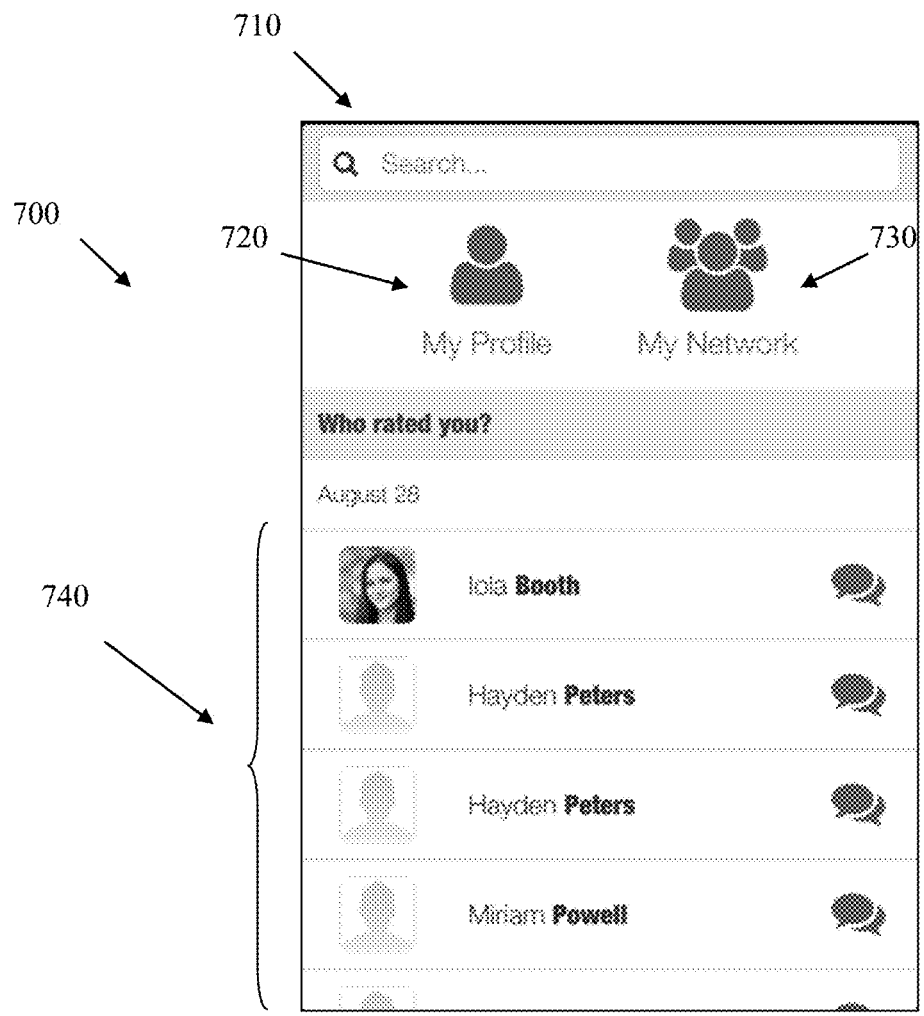
FIG. 7 is a diagram exemplifying how a reviewee may be notified regarding the completion of an evaluation according to an embodiment of the present application.
Figure 8:
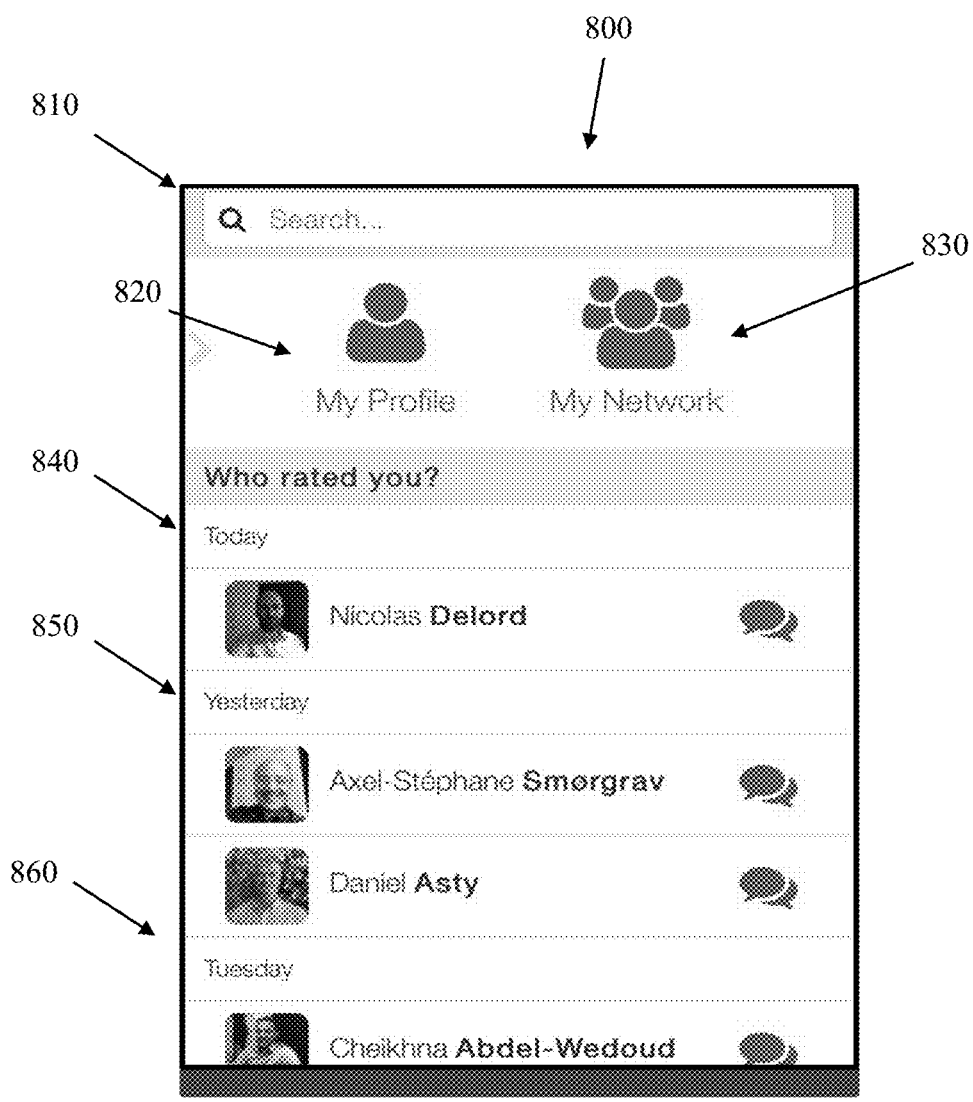
FIG. 8 is a diagram exemplifying how a reviewee may be notified regarding the completion of an evaluation according to an embodiment of the present application according to an embodiment of the present application.

FIGS. 7 and 8 represent examples of how a reviewee may be notified regarding the completion of an evaluation. In FIG. 7, a home display 700 is generated and presented to a reviewee. As a preliminary matter, the home display 700 contains a search bar 710 where the reviewee may search for a reviewer. Additionally, the home display 700 also allows the reviewee to access the information stored in the user profile 720 and may view all of the individuals in the network 730 from the home display 700. The home display 700 also contains a list of all of reviewers 740 who have evaluated the reviewee that day. The list of all reviewers 740 may be presented by reviewer name. The list of all reviewers 740 may also have the image associated with the reviewer that is obtained from the reviewer's profile.

In FIG. 8, the reviewee is presented with a similar home display 800. The home display 800 contains a search bar 810 where the reviewee may search for a reviewer. Additionally, the home display 800 also allows the reviewee to access the information stored in the user profile 820 and may view all of the individuals in the network 830 from the home display 800. The home display 800 also contains a list of all of reviewers 840 who have evaluated the reviewee that day, the previous day 850, or any preceding day or time period 860. The list of all reviewers 840, 850, and 860 may be presented by reviewer name. The list of all reviewers 840, 850, and 860 may also have the image associated with the reviewer as pulled from the reviewer's profile.

Figure 9:
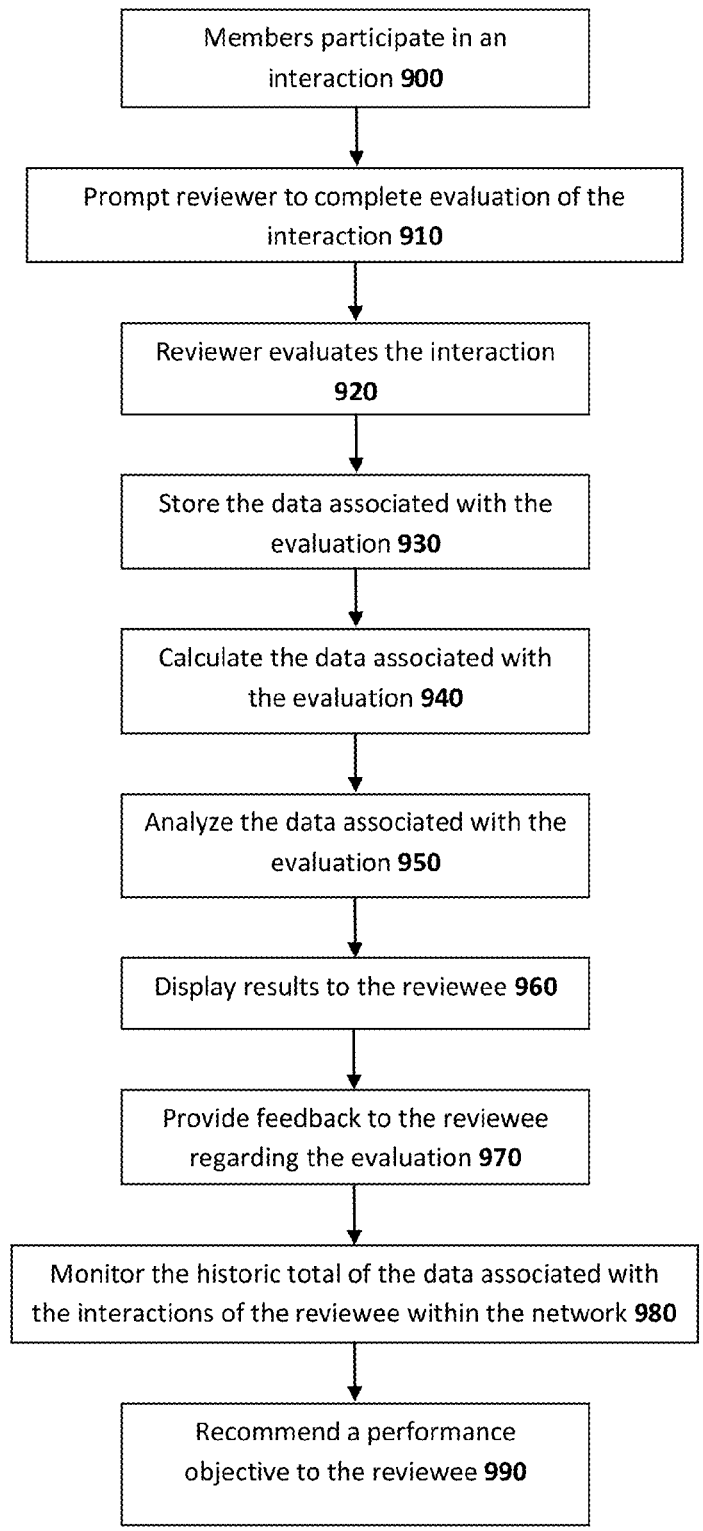
FIG. 9 is a flow chart exemplifying a process for interaction improvement of a reviewee based on an interaction with a reviewer according to an embodiment of the present application.

FIG. 9 is a flow chart exemplifying a process for interaction improvement of a reviewee based on an interaction with a reviewer.

In block 900, an interaction occurs between one or more reviewees and one or more reviewers. The reviewee and the reviewer may be assigned to one or more of the same groups or teams. Thus, one or more interactions may occur between reviewees and reviewers on the same group or team, or between reviewees and reviewers of a different group or team.

In block 910, the reviewer is prompted to evaluate the reviewee's performance, conduct, skills, or competencies exhibited during an interaction. Prompting may occur by a variety of methods. For examples of how to prompt an evaluation of an interaction, see FIGS. 2 and 3 and the accompanying disclosures.

In block 920, the reviewer will complete an evaluation of the interaction. According to an embodiment, the data indicative of the evaluation consists of a binary rating (e.g., "YES" or "NO") regarding the quality of the interaction. For an example of the method and criteria for how a reviewer may complete an evaluation of an interaction as described in block 920, see previous FIGS. 4 and 5.

In blocks 930 and 940, the data indicative of an evaluation is then stored and calculated into a score. The score may be in the form of a NPS®.

Additionally, the data may be calculated over a period of time to create an overall score. For example, this time period may be a daily score. The daily score consists of all of the evaluations associated with a particular reviewee on a given day. Optionally, the daily score may be displayed to the reviewee. For an example of an algorithm that may be used to calculate the daily score block 940, see FIG. 2 and its accompanying disclosure.

In block 950, the score associated with the NPS® is then analyzed to create a historic score of all interactions associated with the reviewee. The historic score may be a numerical score calculated from data associated with evaluations from a particular reviewer, a particular group of network members, or all of the reviewee's interactions during a particular time period. The historic score may also include the behavioral descriptors rated as "YES" or "NO" most frequently by a particular reviewer, a group of reviewers, or all of the behavioral descriptor data during a particular time period. The historic score may be accessed/reviewed by the reviewee, the network administrator, or any other designated network member.

The historic score may be calculated for any time period, such as weekly, monthly, or yearly. By way of example, the historic score may be related to the evaluations compiled over a 5-week, 3-month, 6-month, or 12-month time period. The historic score may also be a total score for all of the evaluations associated with the reviewee.

An example of a historic score is the 5-week score. For a description of the 5-week score and an example of an algorithm that may be used to the 5-week score as described in block 950, see FIG. 2 and its accompanying disclosure.

Moreover, the evolution of a reviewee's five most recent weekly scores may be displayed to the reviewee. The display may be a numerical total and a pictorial or graphical representation. Previous FIG. 6 represents the evolution of a reviewee's five-week score in table form.

In block 960, the results of the evaluation (i.e., NPS®) and the historic total are displayed to the reviewee. The display may also provide a comparison of the results of any evaluation to the reviewee's historic total. The display may also provide a comparison of the result of the reviewee's historic total. Examples of the display include, but are not limited to, a numerical total and a pictorial or graphical representation. This display allows the reviewee to assess its progress over time with respect to its score with respect to a particular reviewer or type of interaction. The reviewee may also compare its historical score with respect to other historical scores obtained by itself or by other persons.

Information of prior reviewers may also be displayed to the reviewee in block 960. That is, the display may show the other members that have rated a prior interaction with the reviewee. This display may be used to suggest that the reviewee conducts a symmetrical evaluation of other members. By way of example, if member A rates member B, then member B is made aware of the evaluation, and decides to rate member A in return. For an example of how a reviewee may conduct a symmetrical evaluation, see previous FIGS. 7 and 8.

In block 970, the reviewee receives feedback regarding the evaluation. For example, the reviewee may be notified that an evaluation has been completed. The feedback may be presented via a text notification, a picture message (image of the reviewee from the reviewee's profile), or a combination of the same.

Figure 10:
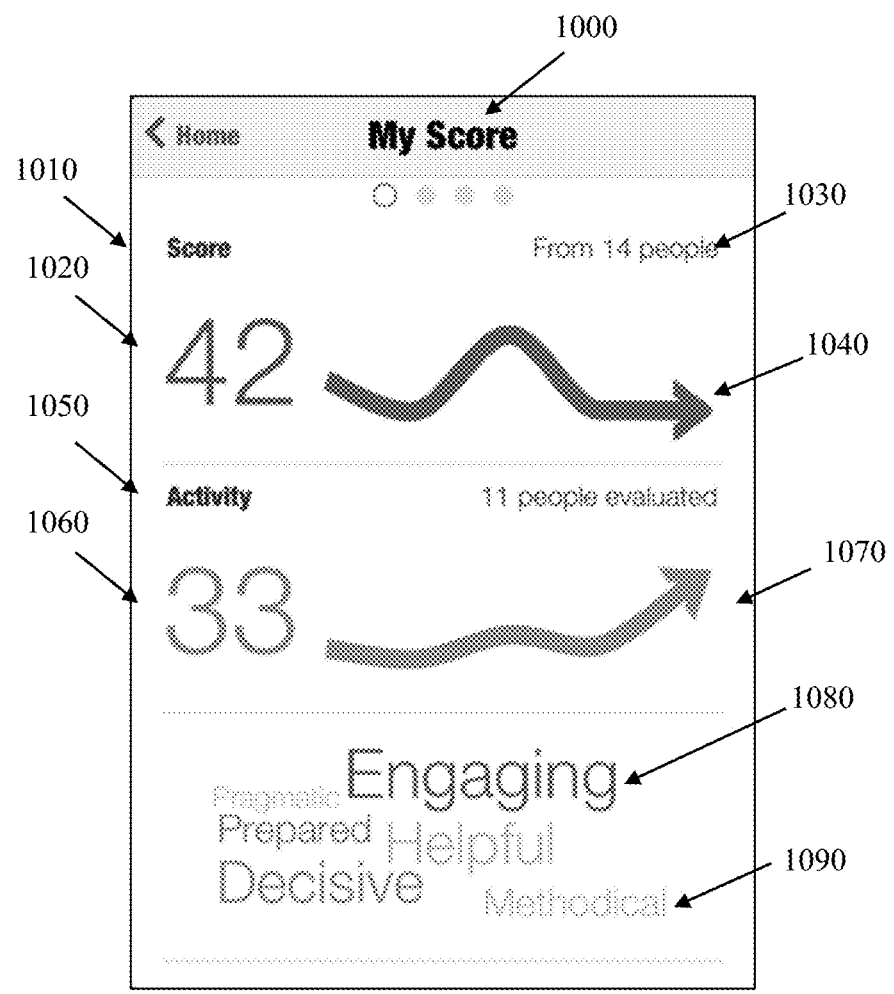
FIG. 10 is a diagram exemplifying how a historical score is displayed to a reviewee according to an embodiment of the present application.
Figure 11:
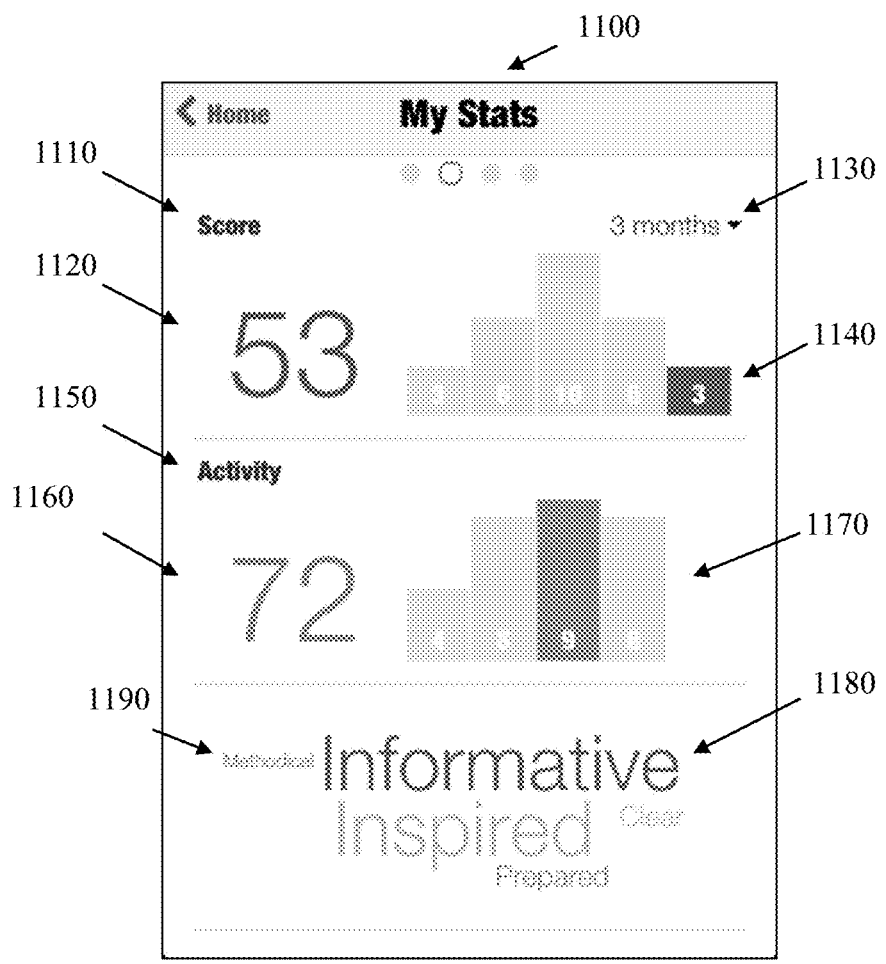
FIG. 11 is a diagram exemplifying how a historical score is displayed to a reviewee according to an embodiment of the present application.

In block 980, the historic total of the data associated with the interactions of the reviewee is monitored. FIGS. 10 and 11 exemplify how a historical score may be displayed to a reviewee.

FIG. 10 is a diagram exemplifying how a historical score is displayed to a reviewee. A home display 1000 is generated and displayed to a reviewee. The home display 1000 depicts data related to the reviewee's evaluations that may be presented as a score 1010 or activity 1050. The reviewee's historic score 1020 and the number of reviewers 1030 may be displayed on the home display 1000. The reviewee's historic score 1020 may be presented as numerically, and the historic score 1020 may be presented pictorially 1040 or by other similar graphics. The home display 1000 also depicts a historic score related to a specific activity that the reviewee receives an evaluation for 1050. The reviewee's historic activity score 1060 and the number of reviewers who evaluated the reviewee for this activity 1070 may be displayed on the home display 1000. The reviewee's historic activity score 1050 may be numerically 1060, and the historic activity score 1070 may be pictorially 1040 or by other similar graphics. Additionally, the home display 1000 may also displays the behavioral descriptors that reviewers most commonly associated with the reviewee 1080, as well as the behavioral descriptors that are least associated with the reviewee 1090. Optionally, the most commonly associated behavioral descriptors 1080 may be displayed in a larger font or by other similar graphics, whereas the least associated behavioral descriptors 1090 may be displayed in a smaller font or by other similar graphics.

FIG. 11 is a diagram exemplifying how a historical score is displayed to a reviewee. A home display 1100 is displayed to a reviewee. The home display 1100 depicts data related to the reviewee's evaluations that may be presented as a score 1110 or activity 1150. The reviewee's historic score 1020 and the time period in which the evaluations occurred 1130 may be displayed on the home display 1000. The reviewee may view a particular time period 1130 in which the evaluations occurred. The particular time period 1130 may be a daily, monthly, or historic score. Additionally, the particular time period 1130 may be selected from a predetermined dropdown menu. The reviewee's historic score 1120 may be presented numerically or by other similar graphic means. For example, the specific evaluation scores 1140 during the time period 1130 may be displayed on the home display 1100. The home display 1100 also depicts a historic score related to a specific activity that the reviewee received an evaluation for 1150. The reviewee's historic activity score 1160 and the time period in which the evaluations occurred 1130 may be displayed on the home display 1100. The reviewee's historic activity score 1150 may be numerically 1160, and the specific evaluation scores associated with the evaluations of the activity 1170 may be pictorially or numerically presented. Additionally, the home display 1100 may also display the behavioral descriptors which are most commonly associated with the reviewee 1180, as well as the behavioral descriptors that are least associated with the reviewee 1190. Optionally, the most commonly associated behavioral descriptors 1180 may be displayed in a larger font or by other similar graphics, whereas the least associated behavioral descriptors 1190 may be displayed in a smaller font or by other similar graphics.

In block 990, a performance objective may then be recommended to the reviewee. For example, a reviewee may set a target in the form of an ideal NPS® score. Likewise, a network administrator or designated network member(s) may set a target NPS® score for the reviewee to obtain, and incentivize future improvements in self-behavior or self-performance by linking them to increased compensation or other benefit.

The ideal rating score may focus on a desirable score for an isolated interaction with a reviewer, all interactions associated with a particular reviewer, all interactions associated with a particular group of network members, or all of the reviewee's interactions during a particular time period. The reviewee, the network administrator, or the designated network member(s) may be notified when or if a target NPS® score is obtained.

The reviewee may also utilize a target NPS® score or historic score as a means of self-promotion or branding. The reviewee may utilize the score within or outside the network. For example, the reviewee may utilize the achievement of a target NPS® score or total historic score on a resume or on social networking.

Figure 12:
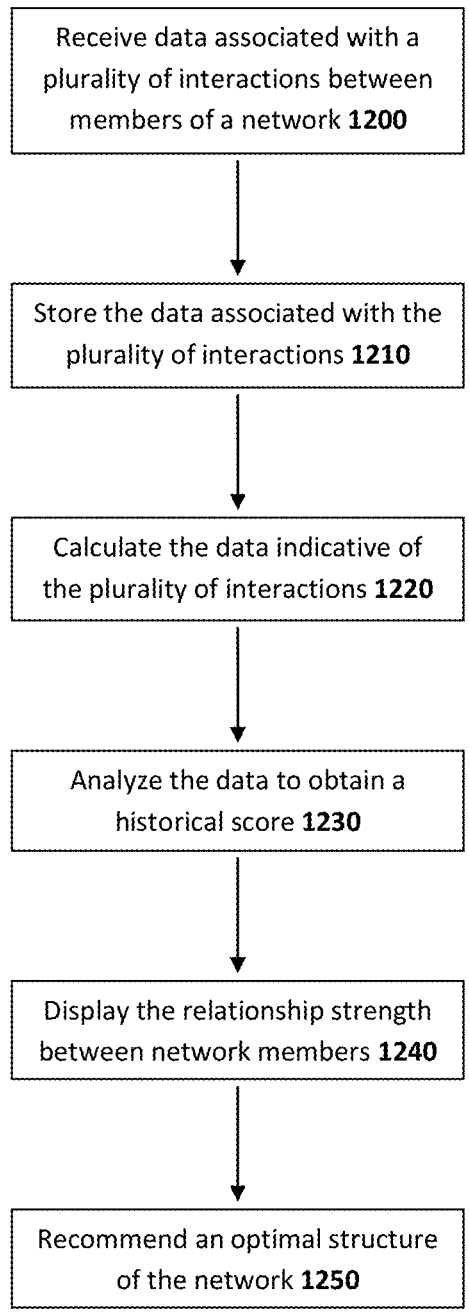
FIG. 12 is a flow chart exemplifying a process to identify and optimize workflow between members of a network according to an embodiment of the present application.

FIG. 12 is a flow chart for the process to identify and optimize workflow between members of a network. In block 1200, data associated with a plurality of evaluations of interactions between one or more reviewees and one or more reviewers is received. An interaction may include any activity with a performance component (e.g., evaluating a meeting, project, or presentation), or a behavioral/social component (e.g., delivery, tone, subject matter). A corollary of the plurality of interactions is relationship strength. Relationship strength is indicated as a function of the frequency and quality of interaction between network members. Network members who interact most frequently and beneficially will have higher relationship strengths. Likewise, network members who interact less frequently and negatively will have lower relationship strengths.

In blocks 1210 and 1220, the data indicative of a plurality of interactions is stored and calculated into a score for each interaction. The score may be in the form of a NPS®. The NPS® represents a score that is indicative of the frequency and strength of each interaction between members of the network. The NPS® is also indicative of the frequency and strength of each relationship between members of the network.

Additionally, the data may be calculated over a period of time to create an overall score. For example, this time period may be a daily score. The daily score consists of all of the evaluations associated with a particular reviewee on a given day. Optionally, the daily score may be displayed to the reviewee. For an example of an algorithm that may be used to calculate the daily score as described in block 1220, please see FIG. 2 and its accompanying disclosure.

In block 1230, the data associated with the NPS® score is then analyzed to create a historical score for each interaction. The historical score may be a numerical score calculated from data related to all interactions associated with a particular member, all interactions associated with a particular group of members, or all of the entity's interactions during a particular time period. The historical score may also include the behavioral descriptors rated as "YES" or "NO" most frequently by a particular member, group of members, or all of the interactions during a particular time period. The historical score may be accessed by the network's administrator, or any other designated member.

The historic score may be calculated for any time period, such as weekly, monthly, or yearly. By way of example, the historic score may be related to the evaluations compiled over a 5-week, 3-month, 6-month, or 12-month time period. The historic score may also be a total score for all of the evaluations associated with a particular network member or group of network members.

An example of a historic score is the 5-week score. For a description of the 5-week score and an example of an algorithm that may be used to the 5-week score as described in block 950, see FIG. 2 and its accompanying disclosure.

In block 1240, a display that demonstrates the relationship strength between network members is generated and presented. This display may also be referred to as a "social graph." The social graph may be a pictorial or graphic representation of the connections between network members or among network groups. For example, network members with high relationship strength will be in closer proximity to each other, and may be displayed with overlapping profile images. The display may also identify strong or weak links, teams, channels, and members. Moreover, the display may identify beneficial or weak activities between network members or among network groups, and may recommend an optimal structure of the network based on relationship strength.

Figure 13:
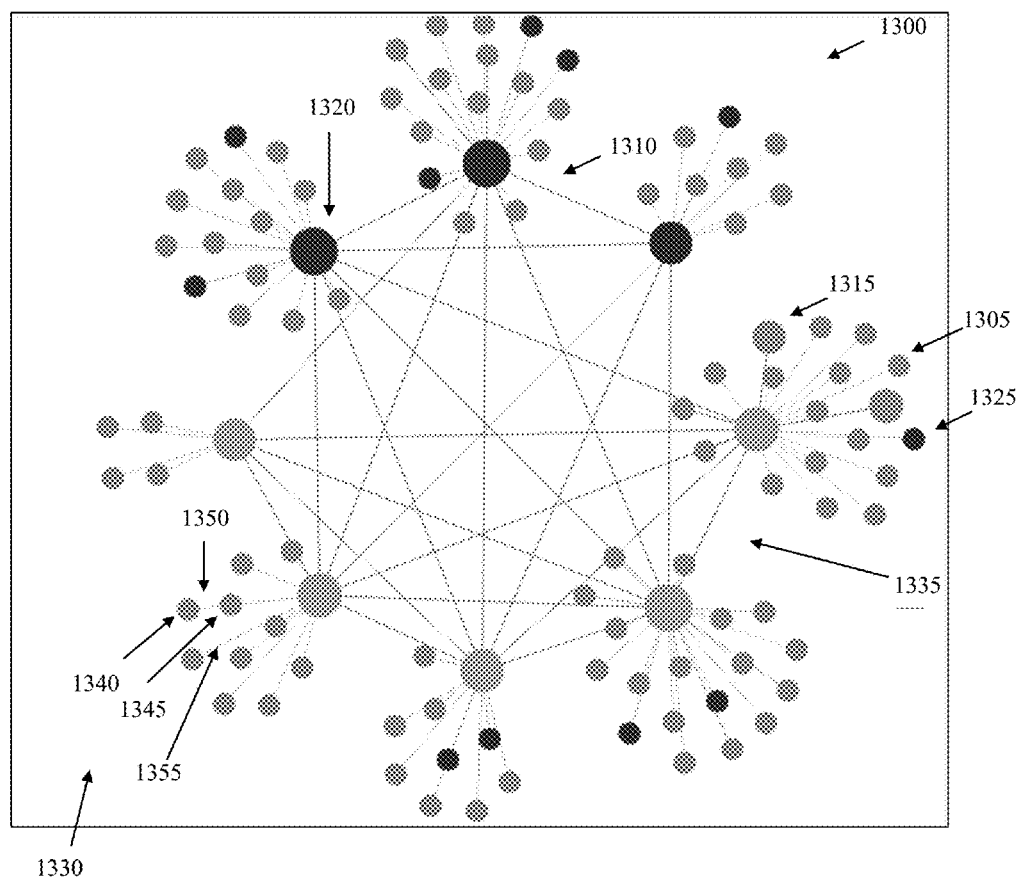
FIG. 13 is a diagram exemplifying the relationship strength among network members according to an embodiment of the present application.
Figure 14:
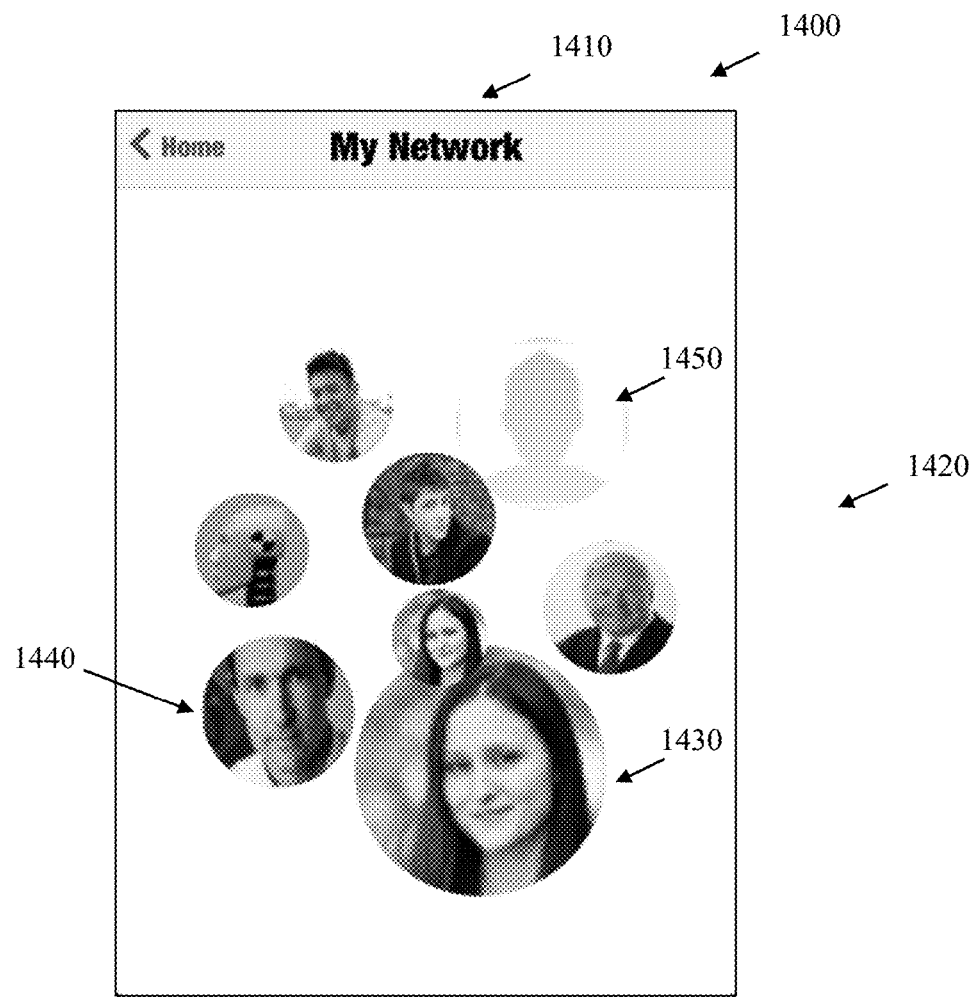
FIG. 14 is a diagram exemplifying the relationship strength between a reviewee and individual members of the reviewee's network according to an embodiment of the present application.

Examples of accomplishing the process of displaying the relationship strength among network members in block 1240 are represented in FIGS. 13 and 14.

FIG. 13 is a diagram exemplifying the relationship strength among network members as an entire network. The total relationship strength for a particular network is displayed as a social graph 1300. In the social graph 1300, each network member is generally represented as a circular image or other like pictorial representation 1305. Relationship strength of an individual network member may be represented by the color and size of the circular image. The relationship strength between network members may be represented by a connection line 1310.

The social graph 1300 depicts the relationship strengths of its network members as a function of interaction productivity and interaction frequency. By way of example, network members who frequently have positive interactions are represented by large green circular images or other pictorial representation 1315, whereas network members who frequently have unproductive network members are represented by large red circular images or other pictorial representations 1320. Likewise, network members who have few interactions or unproductive interactions may be represented as small red circles that are far removed from the group 1320.

The social graph 1300 may also depict relationship strengths between members of the same network group or team 1325. Optionally, the social graph 1300 may depict relationship strength between members of a different group or team 1330.

By way of example, the relationship between two or more network members of the same group or team (1335 and 1340) may be represented as a connection line 1360. If the two or more network members (1330 and 1340) interact frequently, then the connection line 1350 will be smaller. Likewise, a longer connection line 1355 will indicate that the network members interact less frequently.

FIG. 14 is a diagram exemplifying the relationship strength between a reviewee and individual members of the reviewee's network.

The total relationship strength for a particular reviewee is displayed as a social graph 1400. In the social graph 1400, all of the reviewee's interactions with the network members are displayed 1420. By way of example, the reviewee 1430 and each network member 1440 may be represented as a circular image or other like pictorial representation, such as a picture. This picture may be obtained from the reviewee's and network members' respective profiles.

Relationship strength between the reviewee and network members may be represented by the color and size of the circular image. The social graph 1400 depicts the relationship strengths of its network members as a function of interaction productivity and interaction frequency. The relationship strength between network members may be represented by the relative proximity of the images. That is, a network member 1440 with whom the reviewee 1430 interacts most frequently and beneficially are placed closer to each other, whereas a network member 1450 with whom the reviewee interacts less frequently and beneficially is farther away.

In block 1240, the historic NPS® score of relationship strength within the network is monitored. This allows the network administrator to assess the relationship strength over time with respect to a particular network member or members, or a particular type of interaction or interactions. The network administrator may also compare the relationship strength over time with respect to a particular network member as he compares with other network members.

In block 1250, an optimal structure of the network is recommended. This is based on the review of a historic NPS® score of one or more interactions, and comparing it to other network members. The historic NPS® score demonstrates if re-organization of the network is necessary. For example, a network administrator may decide to redeploy one or more members based on a review of the respective relationship strengths with respect to the actual organizational chart of the network. Likewise, the network administrator may identify productive or beneficial activities based on the displayed relationship strengths and promote them. Additionally, the network administrator may identify unproductive activities based on the displayed relationship strengths and decide to eliminate them.

Figure 15:
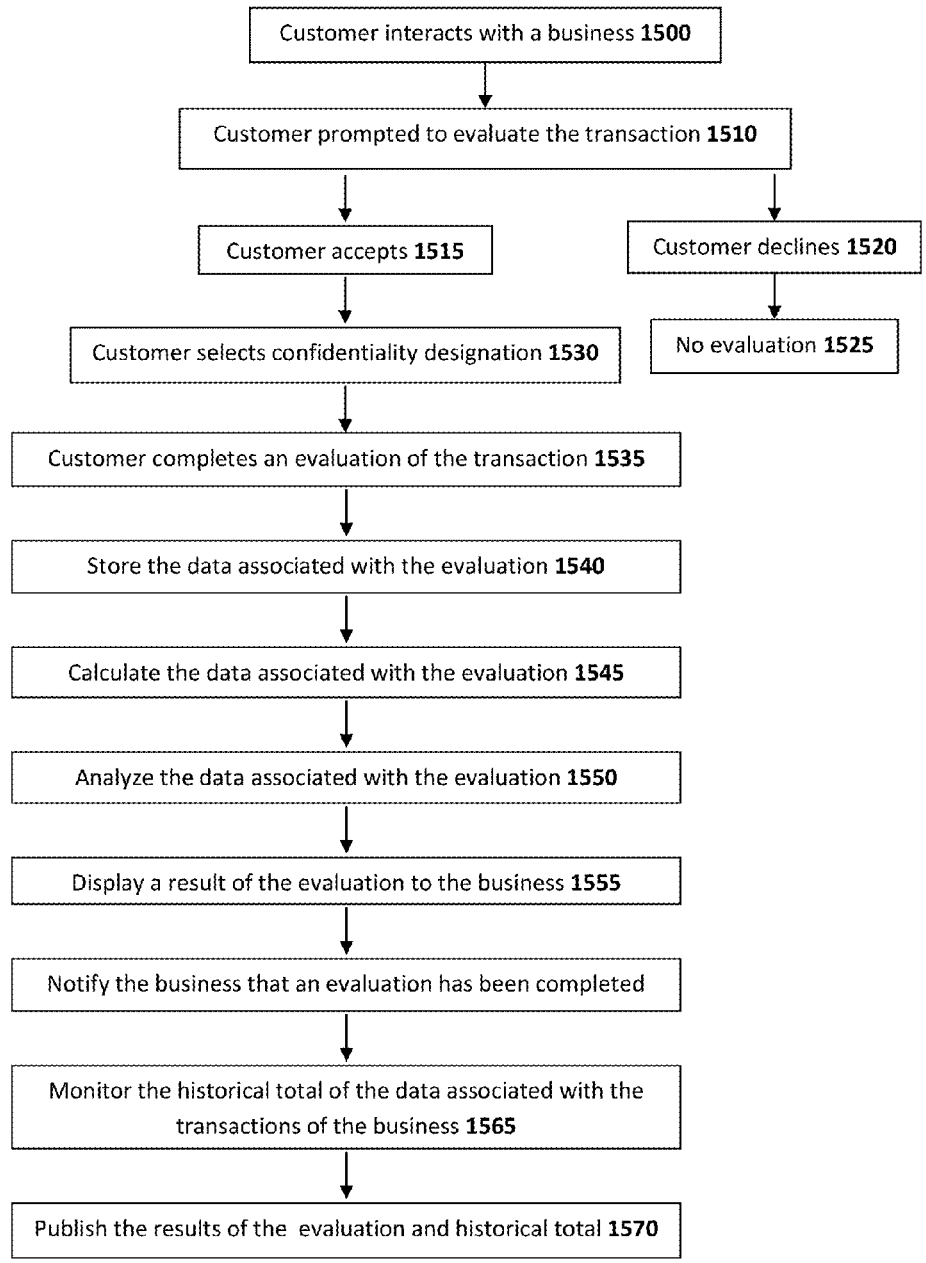
FIG. 15 is a flow chart exemplifying a process to obtain customer feedback regarding an interaction with a business according to an embodiment of the present application.

FIG. 15 is a flow chart for the process to obtain customer feedback regarding an interaction with a business.

In this embodiment, the participants in an interaction include at least one or more customer(s) and at least one or more business(es). The business (or any employee of the business) is the subject of the evaluation, and the customer is responsible for evaluating the business's performance or conduct during the interaction.

In block 1500, a customer will interact with a business. In this embodiment, an interaction is defined as the receipt of goods or services. Additionally, the interaction may or may not require payment by the customer.

In block 1510, the customer is then prompted to evaluate the business's performance or conduct during the interaction. For examples of how to prompt an evaluation of an interaction, see FIGS. 2 and 3 and the accompanying disclosures.

In blocks 1515 and 1520, the customer may accept or decline the evaluation. If the customer declines, no evaluation occurs (1525).

If the customer accepts (block 1525), it may complete an evaluation of the interaction. Before completing the evaluation, the customer may select a confidentiality designation of "known" or "anonymous" (1530). "Known" evaluations become public information, whereas "anonymous" evaluations are accessed only by the business.

Evaluations are intended to be conducted immediately (or as near in time) to the interaction with the business. The point of sale terminal or the customer's device may have a timer to limit the time frame in which the reviewer may complete the evaluation. For an example of an evaluation with a time limit, please see FIG. 5 and its accompanying disclosure.

In block 1535, the customer will then complete an evaluation of the interaction. For an example of the method and criteria for how a reviewer may complete an evaluation of an interaction as described in block 1535, see FIG. 4 and its accompanying disclosure.

Additionally, the customer may then be prompted to evaluate the interaction based on a behavioral descriptor. The customer is prompted to determine whether the behavioral descriptor describes an attribute of the business observed during the interaction. For an example of the method and criteria for how to complete an evaluation of an interaction based on a behavioral descriptor as described in block 1535, see FIG. 5 and its accompanying disclosure.

In blocks 1540 and 1545, the data indicative of an evaluation is then stored and calculated into a score. The score may be in the form of a NPS®.

Additionally, the data may be calculated over a period of time to create an overall score. For example, this time period may be a daily score. The daily score consists of all of the evaluations associated with a particular customer on a given day. Optionally, the daily score may be displayed to the reviewee. For an example of an algorithm that may be used to calculate the daily score, see FIG. 2 and the accompanying disclosure.

In block 1550, the score associated with the NPS® is then to create a historic score of all interactions associated with the same customer. The historic score may be a numerical score calculated from data associated with interactions from a particular customer, data from all interactions associated with a particular group of customers, or data from all customer interactions during a particular time period. The historic score may also include the behavioral descriptors rated as "YES" or "NO" most frequently by a particular customer, a group of customers, or all customer interactions during a particular time period.

The historic score may be calculated for any time period, such as weekly, monthly, or yearly. By way of example, the historic score may be related to the evaluations compiled over a 5-week, 3-month, 6-month, or 12-month time period.

The historic score may also be a total score for all of the evaluations associated with the reviewee.

An example of a historic score is the 5-week score. For a description of the 5-week score and an example of an algorithm that may be used to the 5-week score as described in block 1550, see FIG. 2 and its accompanying disclosure.

Moreover, the evolution of a business' five most recent weekly scores may displayed. For an example of how to display the evolution of the five most recent weekly scores, see FIG. 6 and the accompanying disclosure.

In block 1555, the results of the evaluation (i.e., NPS®) and the historic score are displayed to the business. The display may also provide a comparison of the results of any evaluation to the business' historic score. Examples of the display include, but are not limited to, a numerical total, a picture, or a graph.

In block 1560, the business is notified that an evaluation has been completed. The notification may be a text message, an e-mail message, a pictorial message, or a combination of the same.

In block 1565, the historic NPS® score of the business is monitored. This allows the business to assess its progress over time with respect to its score with respect to a particular customer, a group of customers, or a type of interaction.

In block 1570, the business may then publish a particular evaluation, a target NPS® score, or a historical score as a means of advertising its brand. For example, the business may utilize its target NPS® score or historic NPS® score on its social networking webpage or in general advertising materials.

Figure 16:
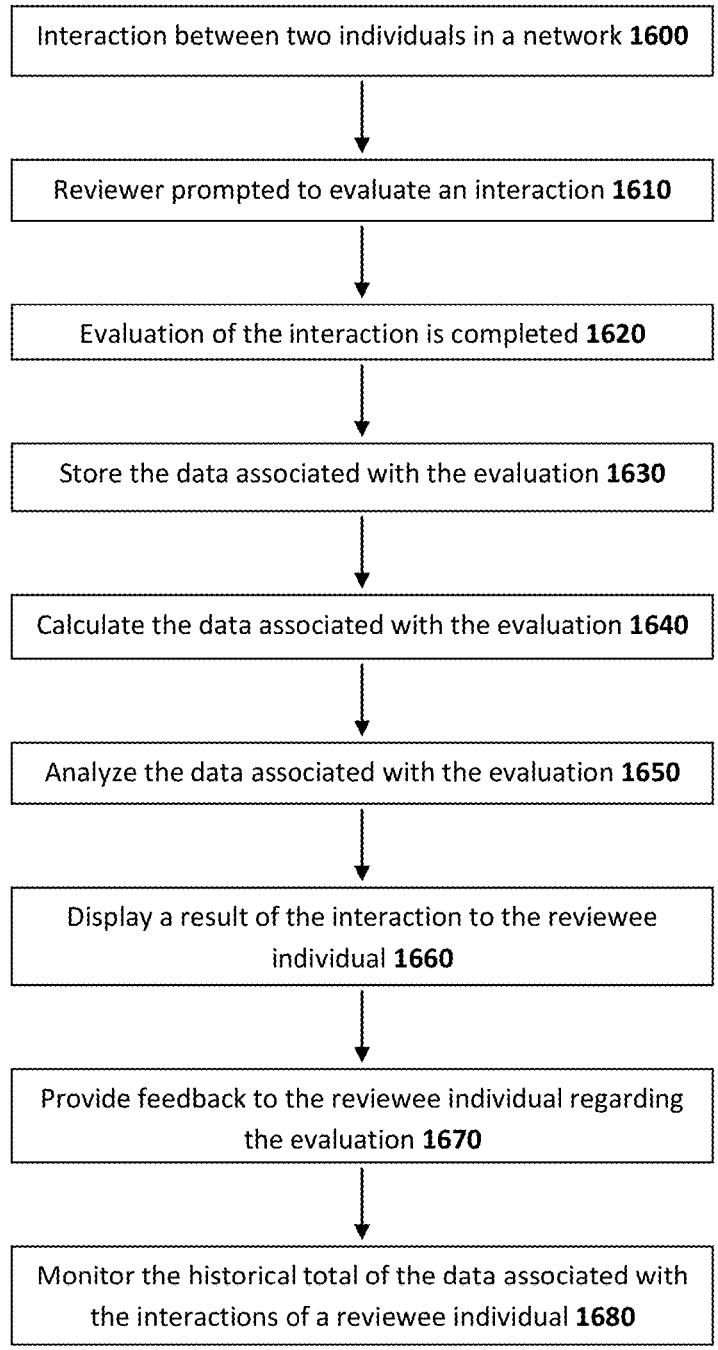
FIG. 16 is a flow chart exemplifying a process to evaluate an interaction between any individuals according to an embodiment of the present application.

FIG. 16 is a flow chart for the process to evaluate an interaction between any two individuals.

In block 1600, an interaction occurs between at least two or more individuals in a public network. A plurality of interactions among individuals in a public network may occur. Individuals may be assigned to one or more groups. Thus, one or more interactions may occur between individuals of the same or different groups.

The participants in an interaction include at least one or more reviewee(s) and at least one or more reviewer(s). At any time, an individual may be a reviewer or a reviewee. The reviewee is the subject of the interaction. The reviewer is responsible for evaluating the reviewee's performance or conduct during the interaction. The reviewer and the reviewee may be strangers, or the reviewer and the reviewee may be familiar with one another.

In block 1610, the reviewer is then prompted to evaluate the reviewee's performance, conduct, skills, or competencies exhibited during the interaction. For examples of how to prompt an evaluation of an interaction, see FIGS. 2 and 3 and the accompanying disclosures.

In block 1620, the reviewer will then complete an evaluation of the interaction. The data indicative of the evaluation consists of a binary rating (e.g., "YES" or "NO") regarding the quality of the interaction. The quality of the interaction may be a performance component (e.g., evaluating a meeting, project, or presentation), or a behavioral or social component (e.g., delivery, tone, subject matter). The reviewer may provide its data input pictorially, or as a number. For an example of how to complete an evaluation of an interaction, please see FIG. 4 and the accompanying disclosure.

Additionally, the reviewer may complete an evaluation of the interaction based on a behavioral descriptor. For an example of to complete an evaluation based on a behavioral descriptor, please see FIG. 5 and the accompanying disclosure.

In blocks 1630 and 1640, the data indicative of an evaluation is then stored and calculated into a score. The score may be in the form of a NPS®.

Additionally, the data may be calculated over a period of time to create an overall score. For example, this time period may be a daily score. The daily score consists of all of the evaluations associated with a particular individual on a given day. Optionally, the daily score may be displayed to the reviewee. For an example of an algorithm that may be used to calculate the daily score, see FIG. 2 and the accompanying disclosure.

In block 1650, the score associated with the NPS® is then analyzed by a series of algorithms to create a historic score of all interactions associated with the same reviewee. The historic score may be a numerical score calculated from a data associated with interactions from a particular reviewer, data from all interactions associated with a particular group of individuals, or data from all of the reviewee's interactions during a particular time period. The historic score may also include the behavioral descriptors rated as "YES" or "NO" most frequently by a particular reviewer, a group of individuals, or all of the interactions during a particular time period. The historic score may be accessed/reviewed by the reviewee, the network administrator, or any other designated network member.

The historic score may be calculated for any time period, such as weekly, monthly, or yearly. By way of example, the historic score may be related to the evaluations compiled over a 5-week, 3-month, 6-month, or 12-month time period. The historic score may also be a total score for all of the evaluations associated with the reviewee.

An example of a historic score is the 5-week score. For a description of the 5-week score and an example of an algorithm that may be used to the 5-week score as described in block 1650, see FIG. 2 and its accompanying disclosure.

Moreover, the evolution of a reviewee's five most recent weekly scores may displayed. For an example of how to display the evolution of the five most recent weekly scores, see FIG. 6 and the accompanying disclosure.

In block 1660, the results of the evaluation (i.e., NPS®) and the historic total are displayed to the reviewee. The display may also provide a comparison of the results of any evaluation to the reviewee's historic total. Examples of the display include, but are not limited to, a numerical total, a picture, or a graph.

In block 1670, the reviewee receives feedback regarding the evaluation. For example, the computer-readable storage medium may notify the reviewee that an evaluation has been completed. The feedback may be presented via a text notification, a picture message (image of the reviewee from the reviewee's profile), or a combination of the same.

In block 1680, the historical NPS® score of the reviewee is monitored. This allows the reviewee to assess its progress over time with respect to its score with respect to a particular reviewer or type of interaction. The reviewee may also compare its historical score with respect to other members of the network.

The reviewee may set performance objectives based on the monitoring of the historical NPS® as described in block 1680. For example, a reviewee may set a target in the form of an ideal NPS® score. Likewise, a network administrator or designated network member(s) may set a target NPS® score for the reviewee to obtain, and incentivize future improvements in self-behavior or self-performance.

The ideal rating score may focus on a desirable score for an isolated interaction with a reviewer, all interactions associated with a particular reviewer, all interactions associated with a particular group of network members, or all of the reviewee's interactions during a particular time period. The reviewee, the network administrator, or the designated network member(s) may be notified when or if a target NPS® score is obtained.

In block 1690, the reviewee may publish a particular evaluation, a target NPS® score, or a historical score as a means of self-promotion or branding. For example, the reviewee may utilize the achievement of a target NPS® score or historical score on a resume or on a social networking website.

Embodiments of the disclosure are implemented by computers and systems using one or more programmable member devices. An example of a system containing a computer-readable storage medium with instructions for evaluating a plurality of interactions between reviewees and reviewers is portrayed in FIG. 17.

The present disclosure is also related to generating a machine interface that includes functional icons or buttons corresponding to the steps and processes disclosed herewith. The machine interface is also configured to present a user the analysis and results as disclosed in the present application.

Figure 17:
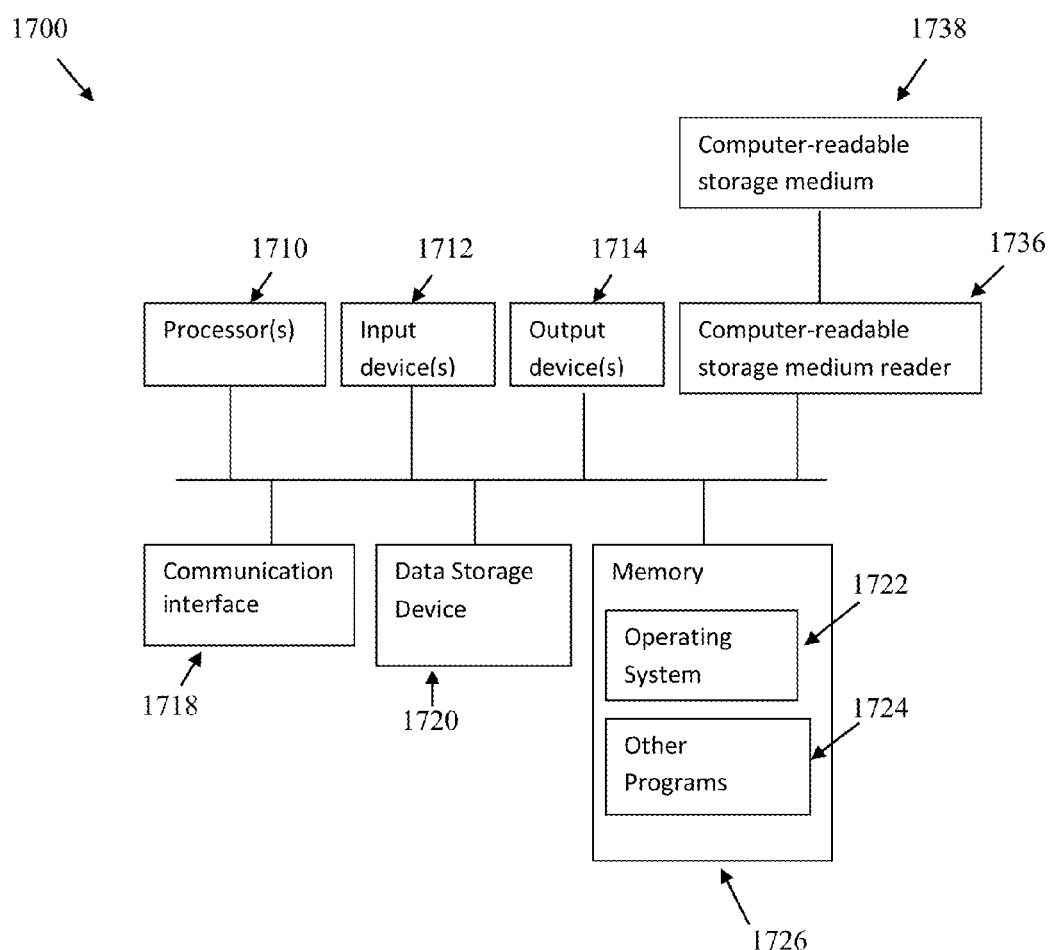
FIG. 17 is a diagram of a system exemplifying a computer-readable storage medium with instructions for evaluating a plurality of interactions between reviewees and reviewers according to an embodiment of the present application.

FIG. 17 depicts a computer or computer system 1700, which includes at least one processor 1710, such as, e.g., an Intel or Advanced Micro Devices microprocessor, coupled to a communications channel or bus 1712. The computer system 1700 further includes at least one input device 1714, at least one output device 1716 such as, e.g., an electronic display device, at least one communications interface 1718, at least one data storage device 1720 such as a magnetic disk or an optical disk, and memory 1722 such as ROM and RAM, each coupled to the communications channel 1712. The communications interface 1718 may be coupled to a network (not depicted) such as the Internet.

The input device(s) 1714 include one or more processors, hardware, and software components. By way of example, the input devices(s) 1714 have hardware components such as a central processing unit (CPU), a random access memory (RAM) component, a read-only memory (ROM) component, a database, storage, input/output device(s), and at least a network display/interface. The input device(s) 1714 also include a keyboard, mouse, touch pad or screen, or other selection or pointing device. Embodiments of the invention include personal communication devices like a cellular phone, tablet, and/or PC or laptop computer.

The input device(s) 1714 in the computer system 1700 include at least one computer-readable storage medium 1736 and at least one computer-storage medium reader 1738 to perform the disclosed computer-implemented methods. The computer-readable storage medium 1736 and 1738 is executed by an application on the input device 1714, or accessed via a website.

The CPU includes a processor to perform the disclosed computer-implemented methods. The CPU may be in communication with other hardware components, such as the RAM, ROM, database, input/output device(s), and a network interface. The CPU also performs the instructions contained in the computer-readable storage medium 1736.

The RAM and ROM also include a component to store information associated with operating the CPU and/or the computer network. The RAM may include a memory device to store data associated with an operation of the CPU.

The storage may include a storage component to store information that the CPU requires to perform the disclosed computer-implemented methods. By way of example, the storage may include a hard drive, CD-ROM, or any other form of media storage device.

The database may include a combination of hardware and/or software components that store and collect the data to be used by the CPU and/or an input device or input devices in the network.

The input/output device(s) may include components to input information into the CPU and/or computers in the computer network, and to display or present information. By way of example, the output device(s) may include a display, monitor, or speaker, and the input device(s) may include a keyboard, button, microphone, and/or mouse. Additionally, the input/output device(s) may be connected to other secondary devices, such as an external hard drive.

The network interface may be configured to transmit and receive information from the CPU and/or a device or device(s) in the network. The network interface may transmit the information across the communication network, such as a local network or the Internet or any other communication network. The device is also capable of connecting to the Internet via Ethernet, WiFi, or cellular network, or to another device that may do so.

Although the computer system 1700 is shown in FIG. 17 to have a single communications channel 1712, a person skilled in the relevant arts will recognize that a computer system may have multiple channels (not depicted), including for example one or more busses, and that such channels may be interconnected, e.g., by one or more bridges. In such a configuration, components depicted in FIG. 17 as connected by a single channel 1712 may interoperate, and may thereby be considered to be coupled to one another, despite being directly connected to different communications channels.

One skilled in the art will recognize that, although the data storage device 1720 and memory 1722 are depicted as different units, the data storage device 1720 and memory 1722 may be parts of the same unit or units, and that the functions of one may be shared in whole or in part by the other, e.g., as RAM disks, virtual memory, etc. It will also be appreciated that any particular computer may have multiple components of a given type, e.g., processors 1710, input devices 1714, communications interfaces 1718, etc. One skilled in the art will also recognize that a plurality of processors and associated memory may constitute a plurality of computers.

The data storage device 1720 and/or memory 1722 may store instructions executable by one or more processors or kinds of processors 1710, data, or both. Some groups of instructions, possibly grouped with data, may make up one or more programs, which may include an operating system 1732 such as Windows 7, Microsoft Windows XP® or Vista™, Linux®, Mac OS®, or Unix®. Other programs 1734 may be stored instead of or in addition to the operating system. It will be appreciated that a computer system may also be implemented on platforms and operating systems other than those mentioned. Any operating system 1732 or other program 1734, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

One skilled in the art will recognize that the computer system 1700 may also include additional components and/or systems, such as network connections, additional memory, additional processors, network interfaces, input/output busses, for example. One skilled in the art will also recognize that the programs and data may be received by and stored in the system in alternative ways. For example, a computer-readable storage medium (CRSM) reader 1736, such as, e.g., a magnetic disk drive, magneto-optical drive, optical disk drive, or flash drive, may be coupled to the communications channel 1712 for reading from a CRSM 1738 such as, e.g., a magnetic disk, a magneto-optical disk, an optical disk, or flash RAM. Alternatively, one or more CRSM readers may be coupled to the rest of the computer system 1700, e.g., through a network interface (not depicted) or a communications interface 1718. In any such configuration, however, the computer system 1700 may receive programs and/or data via the CRSM reader 1736. Further, it will be appreciated that the term "memory" herein is intended to include various types of suitable data storage media, whether permanent or temporary, including among other things the data storage device 1720, the memory 1722, and the CSRM 1738.

Figure 18:
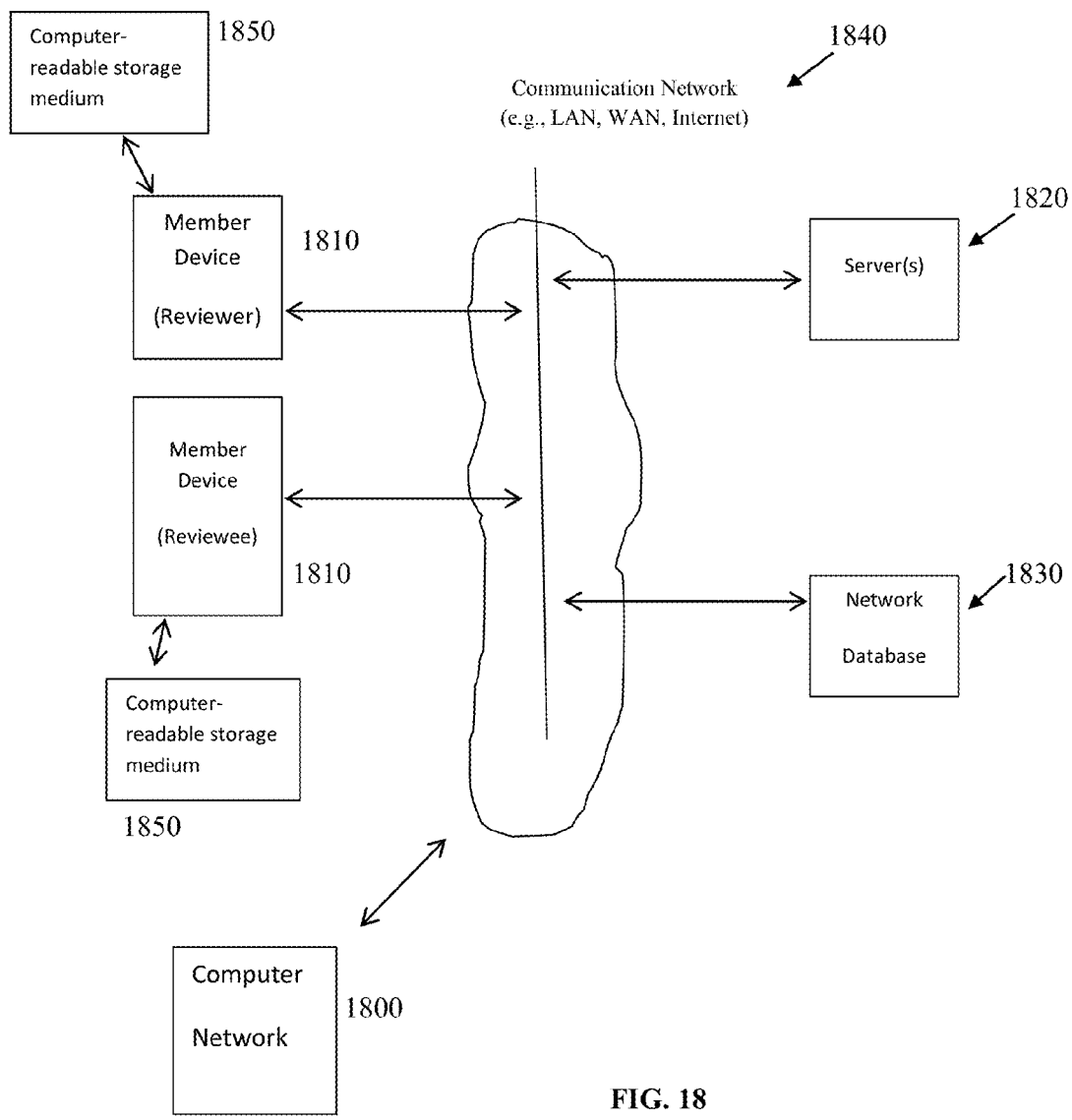
FIG. 18 is a diagram of a system exemplifying evaluating a plurality of interactions between reviewees and reviewers according to an embodiment of the present application.

FIG. 18 depicts a system exemplifying the evaluation of a plurality of interactions between reviewees and reviewers. The system generally comprises a computer network 1800. The computer network 1800 may be private or public. The computer network 1800 may include one or more member device(s) 1810, one or more server(s) 1820, and a network database 1830.

One or more member(s) 1810 may upload data associated with at least one or more objective evaluations of at least one interaction to the network database 1830. The one or more member(s) 1810 may be a device with a processor. Each member device 1810 may, at any time, be a reviewer member device or a reviewee member device. The one or more member(s) 1810 may connect to a communication network (e.g., Internet) to upload the data associated with an objective evaluation to the network database 1830 via one or more server(s) 1820. The one or more member(s) 1810 may communicate with each other via a communication network, e.g., the Internet. The network database 1830 is configured to store the data associated with the at least one or more evaluations of at least one interaction.

Each member device 1810 contains software or a computer-readable storage medium 1850. The computer-readable storage medium 1850 is in turn run on an application. The application may be executed on the member device 1810. The application may also be accessed via a website.

The computer-readable storage medium 1850 contains instructions for evaluating a plurality of interactions in the network on a member device 1810.

The computer-readable storage medium 1850 will first prompt a member device 1810 to complete an objective evaluation of a least one interaction within the network. For example, the computer-readable storage medium 1850 may automatically identify an interaction for evaluation by integrating with a member device 1810. That is, the computer-readable storage medium is capable of integrating with various programs on the member device 1810, such as calendar, e-mails, text messages, phone call histories, and social networking memberships. The computer-readable storage medium 1850 may identify potential interactions to evaluate by linking the events, locations and time within the member device 1810.

For example, the computer-readable storage medium 1850 may identify a meeting in a calendar and prompt an evaluation. The member device 1810 may receive a notification message from the computer-readable storage medium 1850 to evaluate other individuals (potential reviewees) who attended the meeting. The member device 1810 may be presented with a text notification, a picture message, or a combination of the same. The frequency of notification messages may be pre-programmed based on the type of interaction, or the notification messages may be generic.

Additionally, the computer-readable storage medium 1850 may utilize near-field communication technology to detect a reviewee in close proximity to a reviewee's member device 1810. If a reviewee's member device 1810 is detected, the computer-readable storage medium 1850 may send a notification prompt to the reviewer's member device 1810 to evaluate any interactions with that particular reviewee. For additional description of how the computer-readable storage medium may automatically prompt, see FIG. 2 and the accompanying disclosure.

Evaluations are intended to be conducted immediately (or as near in time) to the interaction with the reviewee. The computer-readable storage medium 1850 may have a timer to limit the time frame in which the reviewer may complete the evaluation.

Evaluations may have a confidentiality designation. That is, evaluations within the network may also be known or anonymous. Within the computer-readable storage medium 1850, the reviewer member device 1810 may select whether a particular or series of evaluations is known to all network members or anonymous.

If the reviewer member device 1850 completes an evaluation of at least one interaction with a reviewee, then the data indicative of the interaction is then stored in the network database 1835.

The computer-readable storage medium 1850 will then calculate the data indicative of the interaction into a score. That score may be a NPS®.

The computer-readable storage medium 1850 will then utilize a series of algorithms to create a historic NPS® score. The historical score may be a numerical score calculated from data indicative of all interactions associated with a particular reviewer, all interactions associated with a particular group of network members, or all of the reviewee's interactions during a particular time period. The historic score may also include the qualifiers rated as "YES" or "NO" most frequently by a particular reviewer, a group of network members, or all of the interactions during a particular time period. The historical score may be accessed/reviewed by the reviewee, the network administrator, or any other designated network member.

The computer-readable storage medium 1850 will create a display of results as it pertains to any evaluation and/or the reviewee's historical score. The display may also provide a comparison of the results of any evaluation to the reviewee's historical score. Examples of the display include, but are not limited to, a numerical total, a picture, or a graph.

The computer-readable storage medium 1850 may also provide feedback to the reviewee's member device 1810 regarding the evaluation. The computer-readable storage medium may notify the reviewee that an evaluation has been completed. The reviewee's member device 1810 may be presented with a text notification, a picture message (image of the reviewee from the reviewee's profile), or a combination of the same.

The computer-readable storage medium 1850 may also monitor the historic NPS® score of the reviewee. This allows the reviewee to assess its progress over time through the reviewee's member device 910 with respect to its performance with respect to a particular reviewer or type of interaction.

The computer-readable storage medium 1850 may then recommend a performance objective for the reviewee. For example, a reviewee may set a target in the form of an ideal rating score. Likewise, a network administrator or designated network member(s) may set a target score for the reviewee to obtain. The reviewee may utilize the historical NPS® score or ideal rating score to improve self-behavior or self-performance, which may be linked to increased compensation or other benefit.

The ideal rating score may focus on a desirable score for an isolated interaction with a reviewer, all interactions associated with a particular reviewer, all interactions associated with a particular group of network members, or all of the reviewee's interactions during a particular time period. The computer-readable storage medium may notify the reviewee, the network administrator, or the designated network member(s) if an ideal rating score is obtained.

Although the disclosed subject matter has been described and illustrated with respect to embodiments thereof, it should be understood by those skilled in the art that features of the disclosed embodiments may be combined, rearranged, etc., to produce additional embodiments within the scope of the invention, and that various other changes, omissions, and additions may be made therein and thereto, without parting from the spirit and scope of the present invention.

What is claimed is:

1. A computerized method of evaluating interactions among members of a network, comprising:
   registering the members with the network;
   accessing identity data from an electronic file associated with each member;
   retrieving, from electronic devices of the members of the network, event data related to interactions between a reviewer and a reviewee, both the reviewer and the reviewee being a member of the network, wherein the event data includes a meeting schedule and an email;
   linking the retrieved event data and identifying an interaction between the reviewer and the reviewee based on the linked event data;
   determining whether the reviewee is in close proximity with the reviewer based on near-field signals of the reviewer's electronic device and the reviewee's electronic device;
   transmitting, upon a determination by the determining step that a near-field signal from the electronic device of the reviewee is received by the electronic device of the reviewer, a notification to the electronic device of the reviewer to prompt the reviewer to evaluate the interaction with the reviewee;
   storing input of the reviewer in response to the notification as an electronic evaluation of the interaction;
   generating a personal social graph of the reviewee based on stored electronic evaluations,
   wherein the personal social graph indicates a strength of relationships of the reviewee with other members of the network; and the generating step determines a proximity between the reviewee and another member on the personal social graph based on a frequency of interactions with the reviewee.

2. The computerized method of claim 1, wherein the near-field signal includes a Bluetooth signal.

3. The computerized method of claim 1, wherein the near-field signal includes a wireless signal.

* * * * *